(12) United States Patent
Nuqui et al.

(10) Patent No.: US 11,943,236 B2
(45) Date of Patent: Mar. 26, 2024

(54) TECHNOLOGIES FOR DETECTING CYBER-ATTACKS AGAINST ELECTRICAL DISTRIBUTION DEVICES

(71) Applicant: HITACHI ENERGY LTD, Zürich (CH)

(72) Inventors: Reynaldo Nuqui, Cary, NC (US); Junho Hong, Cary, NC (US); David Coats, Apex, NC (US)

(73) Assignee: HITACHI ENERGY LTD, Zürich (CH)

( * ) Notice: Subject to any disclaimer, the term of this patent is extended or adjusted under 35 U.S.C. 154(b) by 116 days.

(21) Appl. No.: 15/963,850

(22) Filed: Apr. 26, 2018

(65) Prior Publication Data
US 2019/0334932 A1    Oct. 31, 2019

(51) Int. Cl.
*H04L 9/40* (2022.01)
*G05B 19/042* (2006.01)

(52) U.S. Cl.
CPC ...... *H04L 63/1416* (2013.01); *H04L 63/1425* (2013.01); *G05B 19/0428* (2013.01)

(58) Field of Classification Search
CPC .. G05B 19/0428; G05B 23/0254; H04L 63/20
See application file for complete search history.

(56) References Cited

U.S. PATENT DOCUMENTS 7,280,941 B2 * 10/2007 Bonanni ............ G05B 23/0254
                                                   700/30
9,377,341 B1 *  6/2016 Watson .................. H01F 27/12
(Continued)

FOREIGN PATENT DOCUMENTS

CN        101238628 A      8/2008
CN        106671902 A      5/2017
(Continued)

OTHER PUBLICATIONS

A. Gupta and R. Singh, "Computation of Transformer Losses Under the Effects of Non-Sinusoidal Currents," Advanced Computing: An International Journal (ACIJ), vol. 2, No. 6, pp. 91-104, Nov. 2011.*

(Continued)

*Primary Examiner* — Jeffrey Nickerson
*Assistant Examiner* — Vadim Savenkov
(74) *Attorney, Agent, or Firm* — Sage Patent Group

(57) ABSTRACT

Technologies for detecting cyber-attacks against electrical distribution devices include a controller. The controller includes circuitry to determine a first measured value of a first operational parameter of a transformer based upon one or more signals received from one or more sensors of the transformer. The circuitry is also to determine a second measured value of a second operational parameter of the transformer based upon one or more signals received from the one or more sensors of the transformer, calculate a first expected value of the first operational parameter based on the second measured value of the second operational parameter and a model of the transformer that relates the first and second operational parameters, compare the first measured value of the first operational parameter to the first expected value of the first operational parameter, and identify when a difference between the first measured value and the first expected value exceeds a first threshold.

19 Claims, 14 Drawing Sheets

(56) References Cited

U.S. PATENT DOCUMENTS

| | | | |
|---|---|---|---|
| 9,419,430 B1* | 8/2016 | Tostrud | G06Q 10/0635 |
| 9,697,355 B1* | 7/2017 | Park | G06F 21/552 |
| 9,724,979 B1 | 8/2017 | Thumati et al. | |
| 10,542,021 B1* | 1/2020 | Mehr | H04L 63/1425 |
| 2002/0133320 A1* | 9/2002 | Wegerich | G05B 23/0297 |
| | | | 703/2 |
| 2005/0222747 A1* | 10/2005 | Vhora | G05B 23/0254 |
| | | | 701/100 |
| 2005/0223782 A1* | 10/2005 | Dohi | G01N 33/28 |
| | | | 73/53.01 |
| 2009/0312880 A1 | 12/2009 | Venturini Cheim et al. | |
| 2010/0251377 A1* | 9/2010 | Shulman | H04L 63/1433 |
| | | | 726/25 |
| 2011/0039237 A1* | 2/2011 | Skare | G05B 23/0267 |
| | | | 434/118 |
| 2011/0071697 A1* | 3/2011 | Torre | G05B 15/02 |
| | | | 700/295 |
| 2011/0282508 A1* | 11/2011 | Goutard | H02J 3/06 |
| | | | 700/293 |
| 2012/0203508 A1* | 8/2012 | Hamzaoui | G06F 21/55 |
| | | | 702/183 |
| 2013/0104236 A1* | 4/2013 | Ray | H04L 63/1408 |
| | | | 726/25 |
| 2013/0179097 A1* | 7/2013 | Masse | G01M 15/14 |
| | | | 702/55 |
| 2013/0221983 A1* | 8/2013 | Anderson | G01R 31/62 |
| | | | 324/547 |
| 2014/0189860 A1* | 7/2014 | Hull Roskos | G05B 23/0235 |
| | | | 726/22 |
| 2014/0244192 A1* | 8/2014 | Craig | G01R 21/06 |
| | | | 702/62 |
| 2014/0297206 A1* | 10/2014 | Silverman | H02J 13/00034 |
| | | | 702/58 |
| 2014/0305201 A1* | 10/2014 | Watson | G01F 23/18 |
| | | | 73/290 R |
| 2015/0261958 A1* | 9/2015 | Hale | G06Q 10/00 |
| | | | 726/25 |
| 2016/0047765 A1* | 2/2016 | Feng | H01F 27/402 |
| | | | 374/4 |
| 2016/0118186 A1* | 4/2016 | Frimpong | H01F 27/02 |
| | | | 307/119 |
| 2016/0140263 A1* | 5/2016 | Rojas | G05B 23/02 |
| | | | 703/18 |
| 2016/0210556 A1* | 7/2016 | Ben Simhon | G06N 3/08 |
| 2016/0358106 A1* | 12/2016 | Anderson | G06N 7/005 |
| 2016/0366170 A1* | 12/2016 | Bell | G01D 4/004 |
| 2017/0132902 A1* | 5/2017 | Foster | G01R 21/1333 |
| 2017/0322242 A1* | 11/2017 | Lee | G01R 31/62 |
| 2018/0024900 A1* | 1/2018 | Premerlani | G06F 11/2215 |
| | | | 714/41 |
| 2018/0157831 A1* | 6/2018 | Abbaszadeh | G06N 20/00 |
| 2019/0011491 A1* | 1/2019 | Raghavan | G01J 3/00 |
| 2019/0087571 A1* | 3/2019 | Rane | G06F 21/554 |
| 2019/0222596 A1* | 7/2019 | Abbaszadeh | G06F 21/55 |
| 2019/0243977 A1* | 8/2019 | Pfleger de Aguiar | |
| | | | G06F 21/566 |
| 2019/0318837 A1* | 10/2019 | Schwartz | G06F 17/16 |
| 2020/0186549 A1* | 6/2020 | Nogin | H04L 63/1416 |

FOREIGN PATENT DOCUMENTS

| | | | | |
|---|---|---|---|---|
| EP | 1786083 A1 | 5/2007 | | |
| EP | 2033060 B1 | 4/2013 | | |
| WO | WO-2015063715 A2 * | 5/2015 | | G06F 21/566 |
| WO | WO-2016130482 A1 * | 8/2016 | | G01D 4/004 |
| WO | 2018048351 A1 | 3/2018 | | |
| WO | WO-2018038718 A1 * | 3/2018 | | G05B 19/05 |

OTHER PUBLICATIONS

D. Lee, S. K. Cha and A. H. Lee, "A Performance Anomaly Detection and Analysis Framework for DBMS Development," in IEEE Transactions on Knowledge and Data Engineering, vol. 24, No. 8, pp. 1345-1360, Aug. 2012, doi: 10.1109/TKDE.2011.88.*

"IEEE Guide for Loading Mineral-Oil-Immersed Transformers and Step-Voltage Regulators", IEEE Power & Energy Society, Mar. 7, 2012, 120 pages.

Power Transformers—Part 7: Loading guide for oil-immersed power transformers, International Standard, IEC 60076-7, First edition 2005-12, 64 pages.

"IEEE Recommended Practice for Establishing Liquid-Filled and Dry-Type Power and Distribution Transformer Capability When Supplying Nonsinusoidal Load Currents", IEEE Power Engineering Society, Aug. 15, 2008, 54 pages.

"Draft Standard General Requirements for Liquid-Immersed Distribution, Power, and Regulating Transformers", IEEE Power Engineering Society, Apr. 12, 2002, 31 pages.

International Search Report and Written Opinion for PCT/US2019/028668, dated Aug. 9, 2019, 13 pages.

Chinese First Office Action dated Mar. 2, 2022 for Chinese Patent Application No. 201980026222.1, 11 pages (incliuding English summary).

Chinese Second Office Action dated Sep. 30, 2022 for Chinese Patent Application No. 201980026222.1, 10 pages (including English summary).

* cited by examiner

TECHNOLOGIES FOR DETECTING CYBER-ATTACKS AGAINST ELECTRICAL DISTRIBUTION DEVICES

BACKGROUND

The use of industrial control systems (ICS) for controlling transformers in an electrical power grid is becoming more prevalent. Additionally, asset monitoring devices employing sensors for reporting voltage, current, temperature, dissolved gas or oil quality analysis, diminishment in the performance of components in the grid (e.g., bushing or tap changers), and other measurements are becoming more common for transformers. These monitoring devices are beginning to feed into automated substations to provide information about the overall condition of the transformers and their onboard components and to potentially prompt automated control actions. For example, it is becoming more common to utilize transformer tap changer controllers that are microprocessor-based and that have the ability to process remotely issued commands for changing the tap settings (e.g., commands submitted to the controller through a network). However, the ability to remotely (e.g., through a network) control the operations of a transformer may open the possibility of malicious commands (e.g., from a cyber attacker) being sent to and carried out by a transformer, potentially resulting in damage to the transformer and the electrical grid.

SUMMARY OF THE INVENTION

In one aspect, the present disclosure provides a method for securing a transformer. The method includes determining, by a controller of the transformer, a first measured value of a first operational parameter of the transformer based upon one or more signals received from one or more sensors of the transformer. The method also includes determining, by the controller, a second measured value of a second operational parameter of the transformer based upon one or more signals received from the one or more sensors of the transformer. Additionally, the method includes calculating, by the controller, a first expected value of the first operational parameter based on the second measured value of the second operational parameter and a model of the transformer that relates the first and second operational parameters. Further, the method includes comparing, by the controller, the first measured value of the first operational parameter to the first expected value of the first operational parameter and identifying, by the controller, when a difference between the first measured value and the first expected value exceeds a first threshold.

In another aspect, the present disclosure provides a controller for securing a transformer. The controller includes circuitry to determine a first measured value of a first operational parameter of the transformer based upon one or more signals received from one or more sensors of the transformer. The circuitry is also to determine a second measured value of a second operational parameter of the transformer based upon one or more signals received from the one or more sensors of the transformer. Additionally, the circuitry is to calculate a first expected value of the first operational parameter based on the second measured value of the second operational parameter and a model of the transformer that relates the first and second operational parameters, compare the first measured value of the first operational parameter to the first expected value of the first operational parameter, and identify when a difference between the first measured value and the first expected value exceeds a first threshold.

In yet another aspect, the present disclosure provides one or more machine-readable storage media having a plurality of instructions stored thereon that, in response to being executed, cause a controller to determine a first measured value of a first operational parameter of a transformer based upon one or more signals received from one or more sensors of the transformer. The instructions further cause the controller to determine a second measured value of a second operational parameter of the transformer based upon one or more signals received from the one or more sensors of the transformer, calculate a first expected value of the first operational parameter based on the second measured value of the second operational parameter and a model of the transformer that relates the first and second operational parameters, compare the first measured value of the first operational parameter to the first expected value of the first operational parameter, and identify when a difference between the first measured value and the first expected value exceeds a first threshold.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
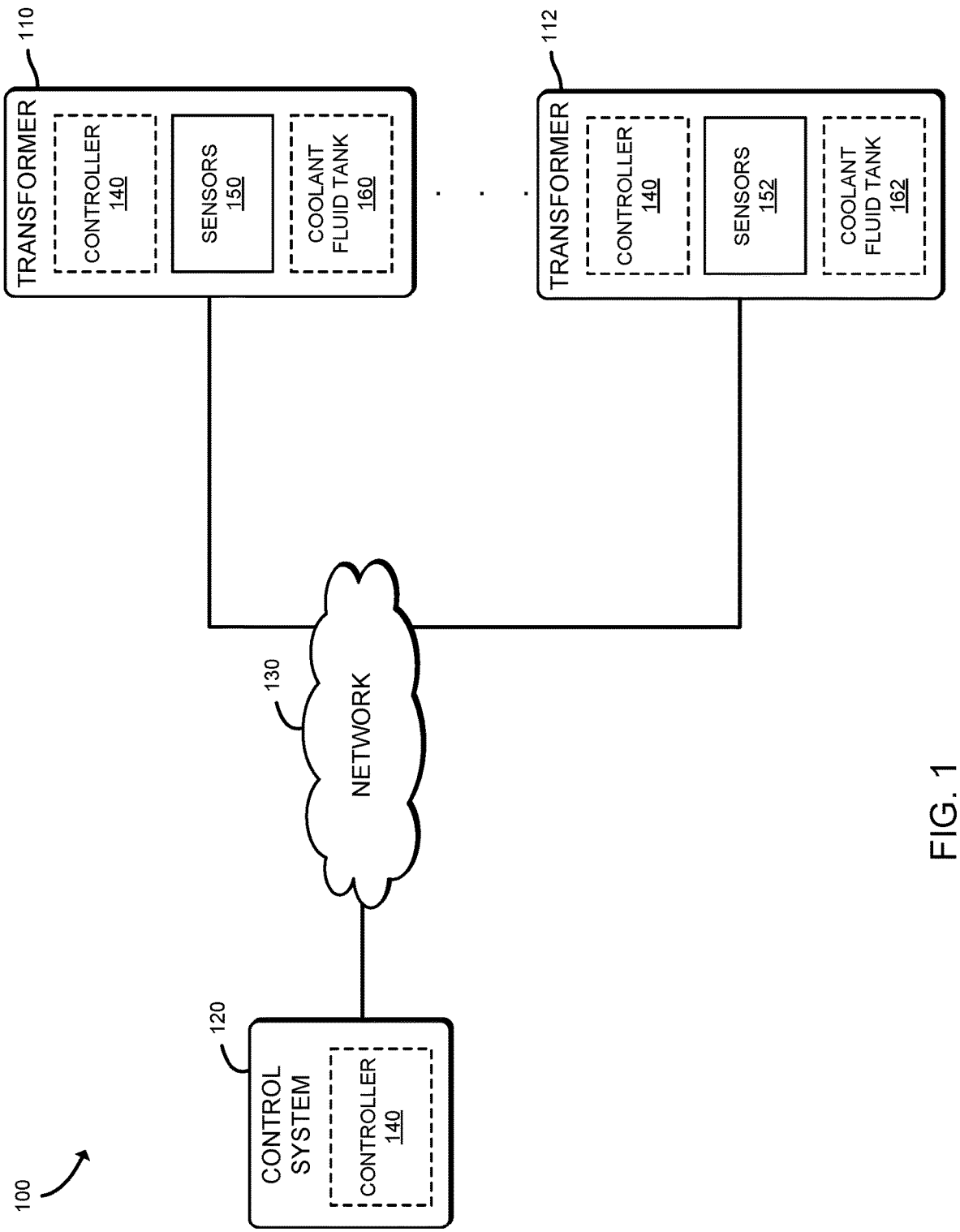
FIG. 1 is a simplified block diagram of at least one embodiment of a system for detecting cyber-attacks against electrical distribution devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for detecting cyber-attacks against electrical distribution devices includes a set of transformers (i.e., electrical distribution devices) 110, 112, each of which may provide electricity to one or more other devices (not shown), and a control system 120 (e.g., an industrial control system) communicatively coupled to the transformers 110, 112 through a network 130. As used herein, the term "electrical distribution" includes both electrical transmission devices and electrical distribution devices, and the corresponding power levels. Each transformer 110, 112 may be embodied as any device or circuitry (e.g., a combination of power electronics and digital electronics, etc.) capable of selectively increasing or decreasing a voltage of an alternating current, such as by transferring electrical energy from a first coil to a second coil through electromagnetic induction using variable turn ratios selected in discrete steps (e.g., with a tap changer) or by other methods, such as by utilizing power electronics to convert alternating current to direct current and back to alternating current (e.g., in a solid state transformer). In the illustrative embodiment, each transformer includes sensors 150, 152 for reporting operational parameters, which may be embodied as any data indicative of conditions (temperatures in one or more portions of the transformer 110, 112, an electrical current in a portion of the transformer, a voltage in a portion of the transformer, etc.) of the transformer 110, 112 at any given time. Each transformer 110, 112 may additionally include a coolant fluid tank 160, 162 which may be embodied as a container of a fluid (e.g., oil) used to cool one or more components of the corresponding transformer 110, 112. In operation, a controller 140, which may be included in each transformer 110, 112 and/or located in the control system 120 obtains measurements, from the sensors 150, 152, of operational parameters of the corresponding transformer 110, 112, applies those measurements to a mathematical model of the relationship between operational parameters of the transformer to determine whether the reported measurements share the same relationship (e.g., by calculating an expected temperature from a reported electrical current), accounting for potential noise in the measurements, and if the relationship from the reported measurements diverges from the relationship indicated in the model by a threshold amount (e.g., the reported temperature exceeds the expected temperature by a predefined threshold amount), determining that the transformer may be subject to a cyber-attack and performing a responsive action, such as generating an alert. As such, the system 100 may provide improved security against cyber-attacks as compared to typical electrical distribution systems.

Figure 2:
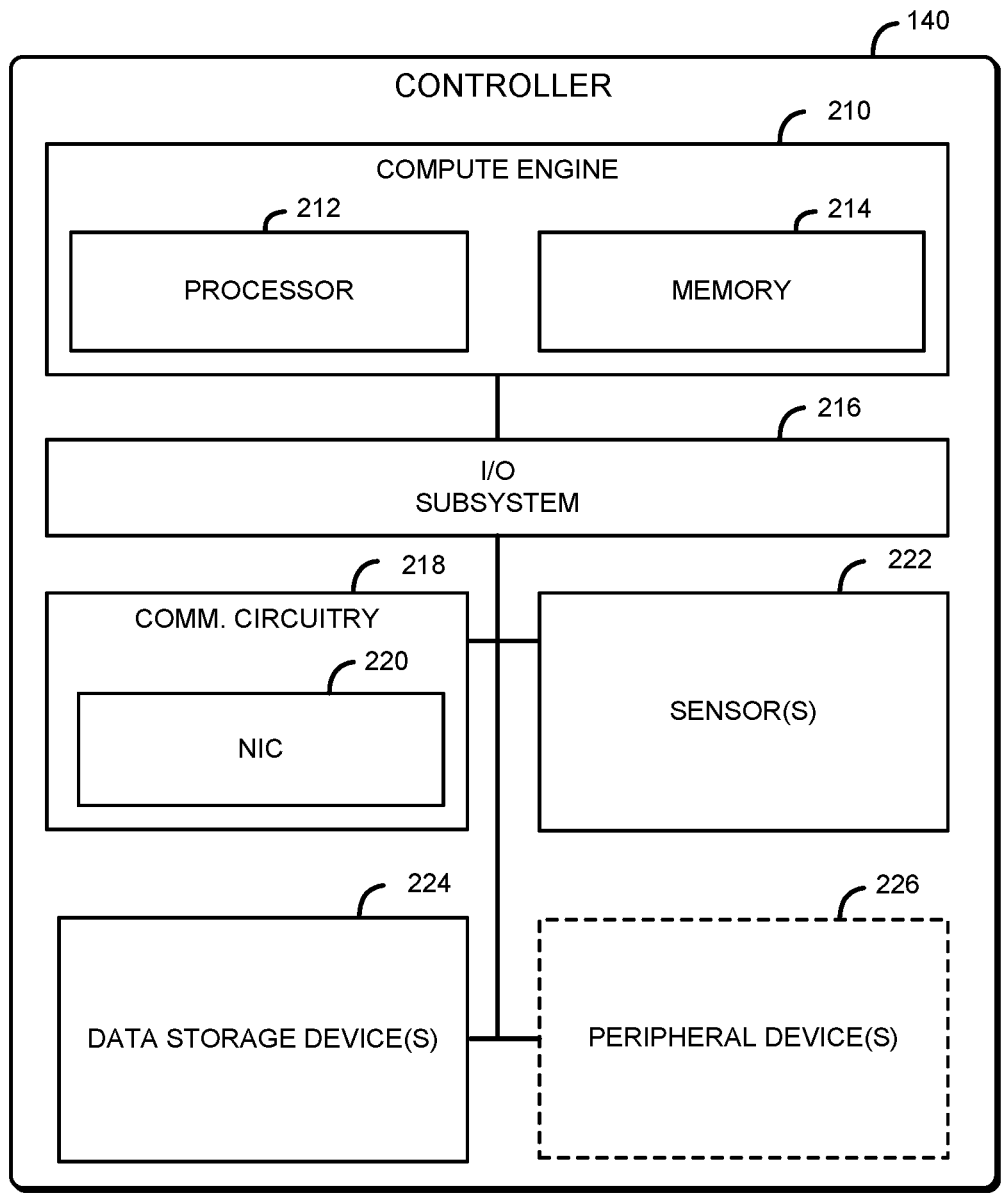
FIG. 2 is a simplified block diagram of at least one embodiment of a controller of the system of FIG. 1.

Referring now to FIG. 2, the controller 140 may be embodied as any type of device (e.g., a computer) capable of performing the functions described herein, including determining a first measured value of a first operational parameter of the transformer based upon one or more signals received from one or more sensors of the transformer, determining a second measured value of a second operational parameter of the transformer based upon one or more signals received from the one or more sensors of the transformer, calculating a first expected value of the first operational parameter based on the second measured value of the second operational parameter and a model of the transformer that relates the first and second operational parameters, comparing the first measured value of the first operational parameter to the first expected value of the first operational parameter, and identifying when a difference between the first measured value and the first expected value exceeds a first threshold.

As shown in FIG. 2, the illustrative controller 140 includes a compute engine 210, an input/output (I/O) subsystem 216, communication circuitry 218, and one or more data storage devices 224. Of course, in other embodiments, the controller 140 may include other or additional components, such as those commonly found in a computer (e.g., display, peripheral devices, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a microcontroller, a single or multi-core processor(s), or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as operational parameters of a transformer 110, 112, thresholds, a mathematical model of the transformer 110, 112, applications, programs, libraries, and drivers.

The compute engine 210 is communicatively coupled to other components of the controller 140 via the I/O subsystem 216, which may be embodied as circuitry and/or components to facilitate input/output operations with the compute engine 210 (e.g., with the processor 212 and/or the main memory 214) and other components of the controller 140. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the controller 140, into the compute engine 210.

The communication circuitry 218 may be embodied as any communication circuit, device, or collection thereof, capable of enabling communications over the network 130 between the controller 140 and another compute device (e.g., one or more compute devices in the control system 120, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 210. The NIC 220 may be embodied as one or more add-in-boards, daughter cards, network interface cards, controller chips, chipsets, or other devices that may be used by the controller 140 to connect with another compute device (e.g., one or more compute devices in the control system 120, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the controller 140 at the board level, socket level, chip level, and/or other levels.

The one or more sensors 222 may be embodied as any type of devices configured to measure and report operational parameters of a corresponding transformer 110, 112. As such, the sensors 222 may include one or more temperature sensors capable of measuring cooling fluid temperatures at one or more locations in the transformer 110, 112, a temperature sensor capable of measuring an ambient temperature, electrical current sensors, voltage sensors, and/or other sensors.

The one or more illustrative data storage devices 224, may be embodied as any type of devices configured for short-term or long-term storage of data such as, for example, memory devices and circuits, memory cards, hard disk drives, solid-state drives, or other data storage devices. Each data storage device 224 may include a system partition that stores data and firmware code for the data storage device 224. Each data storage device 224 may also include an operating system partition that stores data files and executables for an operating system.

Additionally or alternatively, the controller 140 may include one or more peripheral devices 226. Such peripheral devices 226 may include any type of peripheral device commonly found in a compute device such as a display or other output device and/or one more input devices, such as a touchscreen or buttons, forming a human-machine interface (HMI). Additionally, the peripheral devices 226 may include other components, such as a tap changer, for controlling operations of the corresponding transformer 110, 112.

As described above, the transformers 110, 112 and the control system 120 are illustratively in communication via the network 130, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
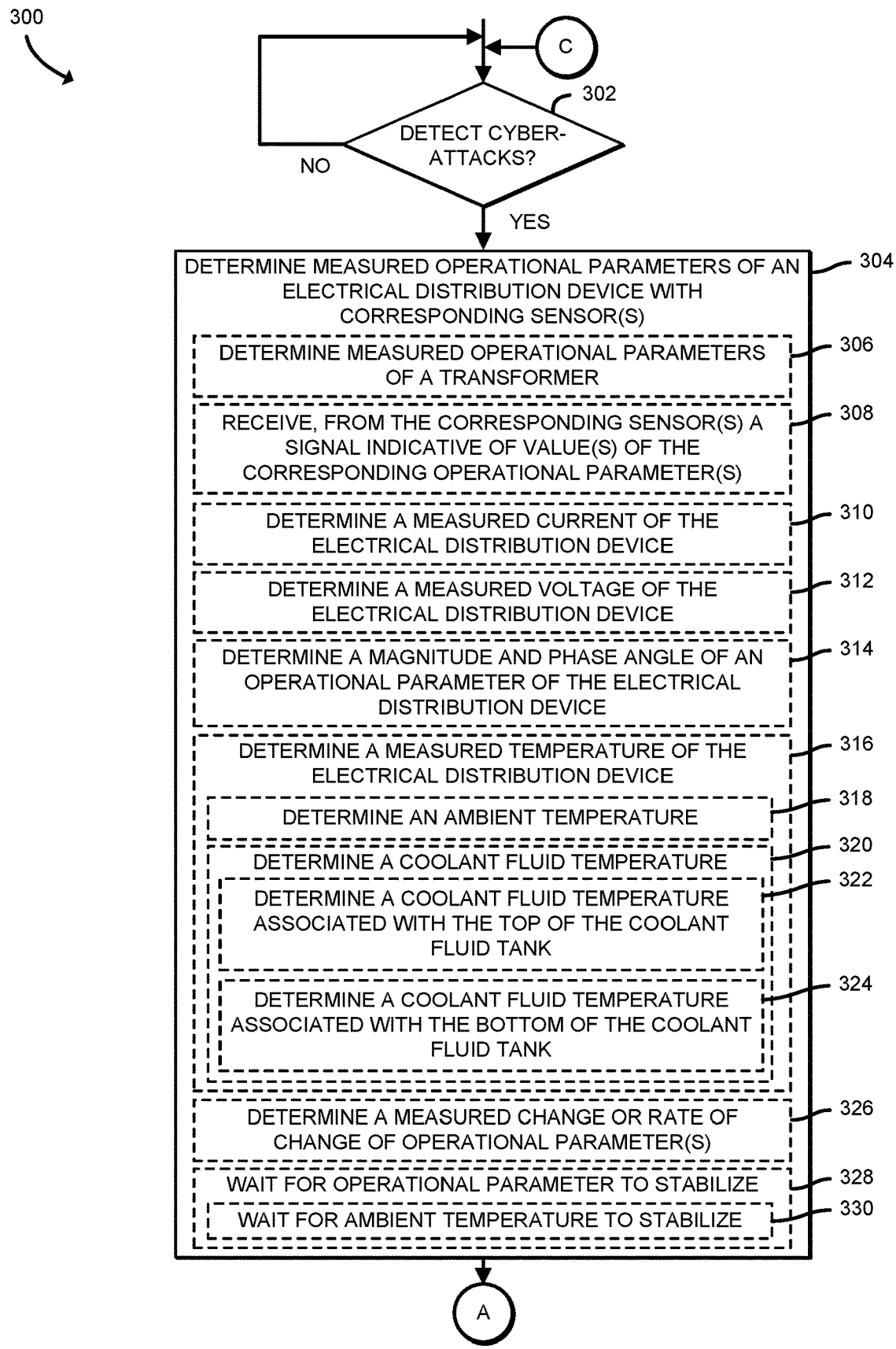
FIGS. 3-5 are a simplified block diagram of at least one embodiment of a method for detecting cyber-attacks that may be performed by the controller of FIGS. 1 and 2.

Referring now to FIG. 3, the controller 140, in operation, may perform a method 300 of detecting a cyber-attack against one or more electrical distribution devices (e.g., the transformers 110, 112). In the illustrative embodiment, the method 300 begins with block 302 in which the controller 140 determines whether to perform detection of cyber-attacks. In the illustrative embodiment, the controller 140 may determine to proceed with performing detection of cyber-attacks if the controller 140 is in communication with one or more sensors 150 of the corresponding electrical distribution device to be monitored (e.g., the transformer 110) and has access to a mathematical model indicative of a relationship between operational parameters of the electrical distribution device (e.g., in the memory 214 of the controller 140). In other embodiments, the controller 140 may determine whether to detect cyber-attacks based on other factors. Regardless, in response to a determination to detect cyber-attacks, the method 300 advances to block 304 in which the controller 140 determines one or more measured operational parameters of an electrical distribution device with one or more corresponding sensors (e.g., the sensors 150). In doing so, and as indicated in block 306, the controller 140 determines measured operational parameters of a transformer (e.g., the transformer 110). Further, and as indicated in block 308, in determining the measured operational parameters, the controller 140 receives, from the corresponding sensors (e.g., the sensors 150), a signal indicative of values of the corresponding operational parameters. As indicated in block 310, the controller 140 may determine a measured electrical current of the electrical distribution device (e.g., the transformer 110). Additionally or alternatively, and as indicated in block 312, the controller 140 may determine a measured voltage of the electrical distribution device (e.g., the transformer 110). In some embodiments, the controller 140 may determine a magnitude and phase angle of an operational parameter of the electrical distribution device, as indicated in block 314. Additionally or alternatively, the controller 140 may determine a measured temperature of the electrical distribution device, as indicated in block 316. For example, and as indicated in block 318, the controller may determine an ambient temperature associated with the electrical distribution device. As indicated in block 320, the controller 140 may also determine a coolant fluid temperature (e.g., a temperature of the coolant fluid in the coolant fluid tank 160). In doing so, the controller 140 may determine a coolant fluid temperature associated with the top of the coolant fluid tank 160, as indicated in block 322. The controller 140 may additionally or alternatively determine a coolant fluid temperature associated with the bottom of the coolant fluid tank 160, as indicated in block 324. As indicated in block 326, the controller 140 may determine a measured change or rate of change of operational parameters. In some embodiments, before proceeding to the next operations in the method 300, the controller 140 may wait for one or more operational parameters to stabilize (e.g., for the rate of change to meet a predefined threshold, for a measured operational parameter to vary within a predefined range, etc.), as indicated in block 328. For example, and as indicated in block 330, the controller 140 may wait for the ambient temperature to stabilize.

Figure 4:
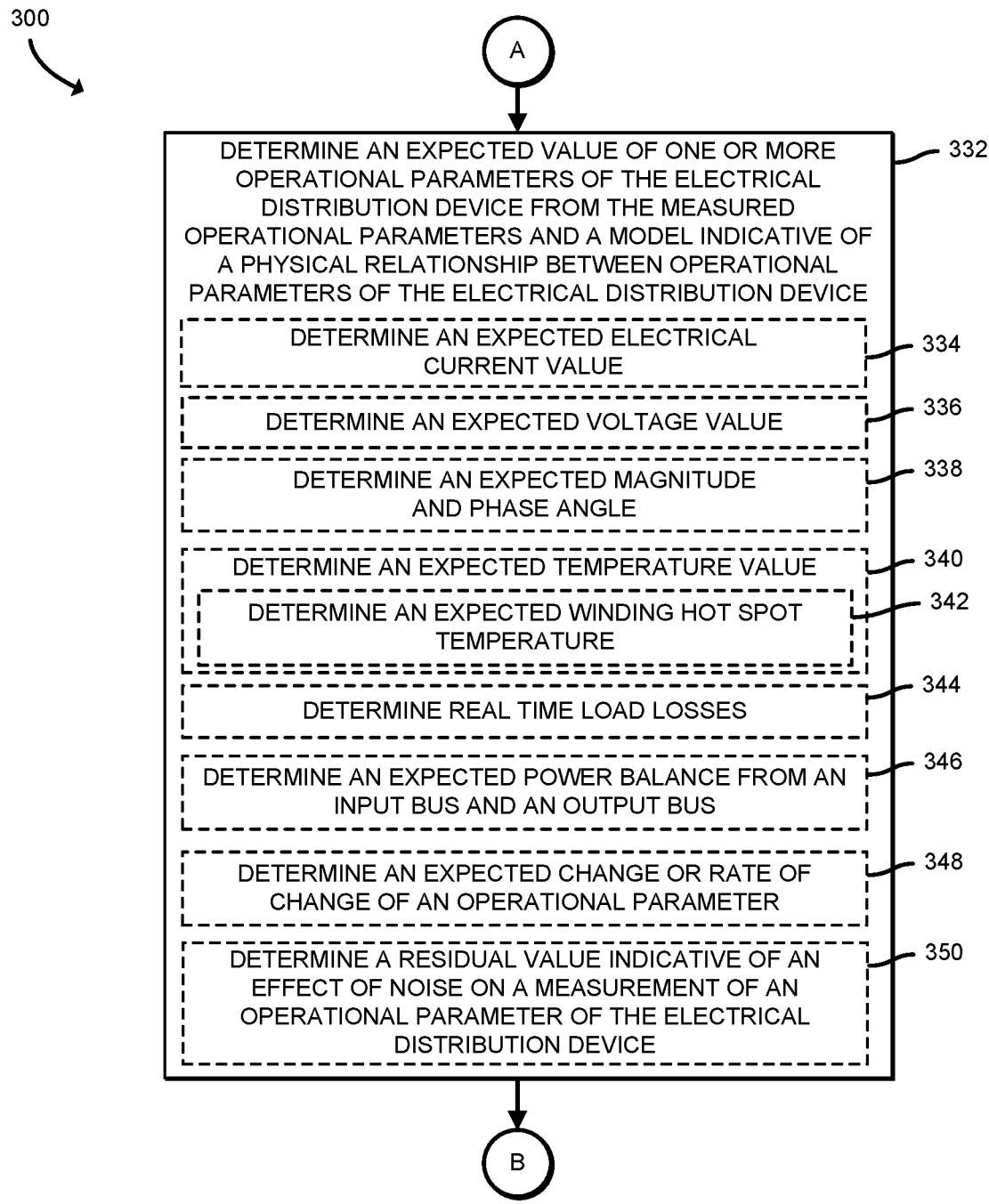

Subsequently, the method 300 advances to block 332 of FIG. 4, in which the controller 140 determines an expected value of one or more operational parameters of the electrical distribution device (e.g., the transformer 110) from the measured operational parameters (e.g., from block 304) and a model indicative of a relationship between operational parameters of the electrical distribution device. In doing so, the controller 140 may determine an expected electrical current value, as indicated in block 334. Additionally or alternatively, the controller 140 may determine an expected voltage value, as indicated in block 336. As indicated in block 338, the controller 140 may determine an expected magnitude and phase angle of one or more operational parameters. Additionally or alternatively, the controller 140 may determine an expected temperature value, as indicated in block 340. For example, and as indicated in block 342, the controller 140 may determine an expected winding hot spot temperature. Additionally, the controller 140 may determine real time load losses as indicated in block 344. In some embodiments, the controller 140 may determine an expected power balance from an input bus and an output bus of the electrical distribution device (e.g., the transformer 110), as indicated in block 346. Further, and as indicated in block 348, the controller 140 may determine an expected change or rate of change of an operational parameter. In some embodiments, the controller 140 may determine a residual value, which may be embodied as a number indicative of an effect of noise on a measurement of an operational parameter of the electrical distribution device (e.g., the transformer 110). Subsequently, the method 300 advances to block 352 of FIG. 5 in which the controller determines whether one or more of the measured operational parameter(s) satisfy corresponding threshold value(s).

Figure 5:
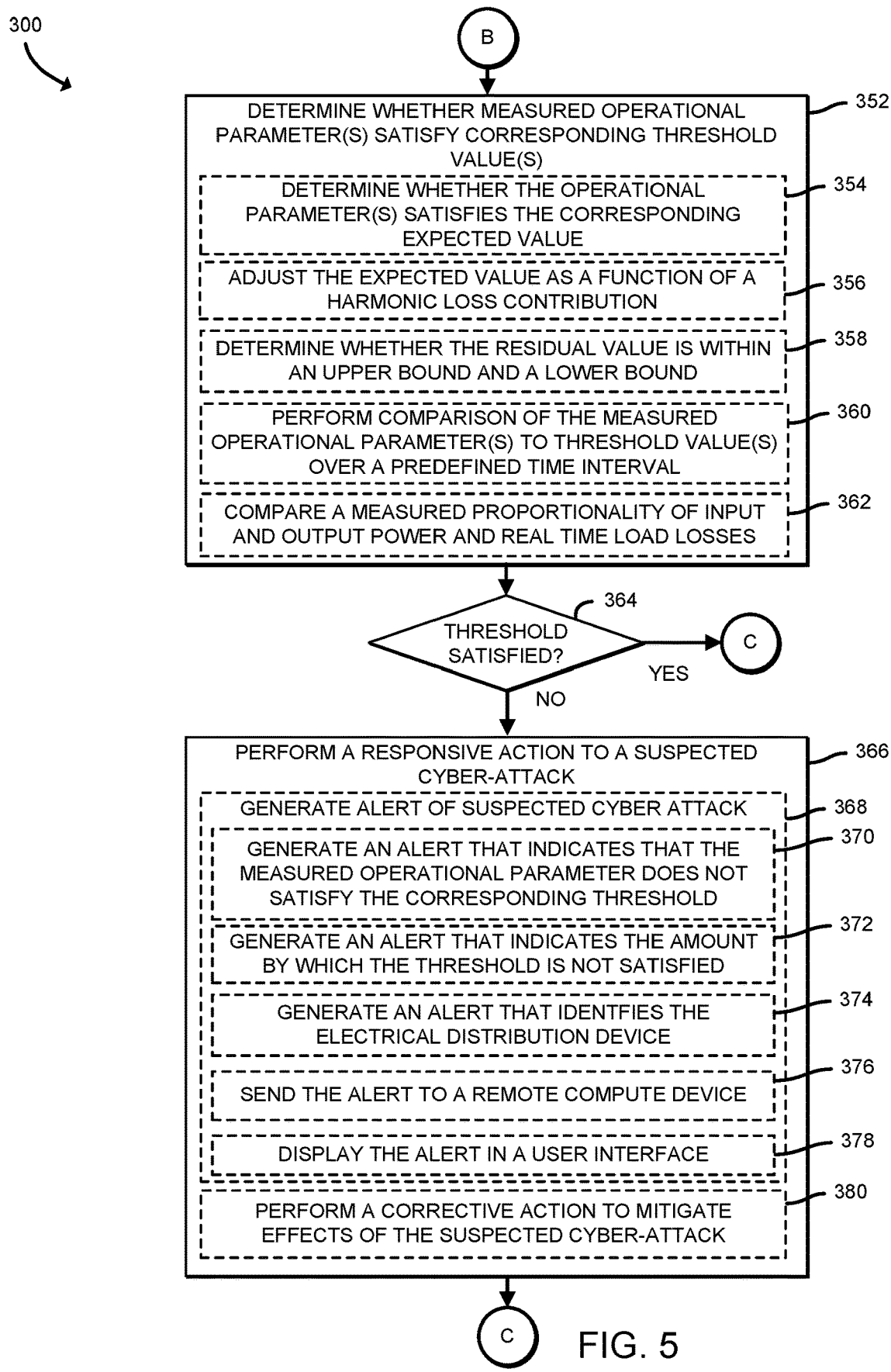

Referring now to FIG. 5, in determining whether one or more of the measured operational parameter(s) satisfy corresponding threshold value(s), the controller 140 may determine whether the operational parameter(s) satisfy a corresponding expected value (e.g., from block 332), as indicated in block 354. In some embodiments, the controller 140 may adjust the expected value (e.g., from block 332) as a function of a harmonic loss contribution, as indicated in block 356. In embodiments in which the controller 140 determines a residual value (e.g., in block 350), the controller 140 determines whether the residual value is within a predefined upper bound and lower bound (e.g., within an expected range), as indicated in block 358. The controller 140 may, in some embodiments, perform a comparison of the measured operational parameters to one or more threshold values over a predefined time interval, as indicated in block 360. In some embodiments, the controller 140 may compare a measured proportionality of input and output power and real time load losses, as indicated in block 362. Subsequently, in block 364, the controller 140 determines whether the threshold is satisfied. If so (e.g., a measured value is within a predefined range of a corresponding expected value), the method 300 loops back to block 302 in which the controller 140 determines whether to continue detection of cyber-attacks. Otherwise, the method 300 advances to block 366, in which the controller 140 performs a responsive action to a suspected cyber-attack.

In performing a responsive action, the controller 140 may generate an alert indicative of a suspected cyber-attack, as indicated in block 368. In doing so, the controller 140 may generate an alert that indicates the measured operational parameter does not satisfy the corresponding threshold, as indicated in block 370. As indicated in block 372, the controller 140 may generate an alert that indicates the amount by which the threshold is not satisfied (e.g., a measured temperature exceeds the expected temperature by 10 degrees, etc.). The alert may also identify the electrical distribution device to which the alert pertains (e.g., by a serial number, a media access control address (MAC), an internet protocol (IP) address, a geographical location, etc.), as indicated in block 374. The controller 140 may send the alert (e.g., data indicative of the alert) to a remote compute device (e.g., a compute device in the control system 120), as indicated in block 376. Additionally or alternatively, the controller 140 may display the alert in a user interface (e.g., with an HMI connected to the controller 140), as indicated in block 378. As indicated in block 380, the controller may perform a corrective action (e.g., by adjusting a tap changer setting, by deactivating the electrical distribution device to await inspection by a technician, etc.) to mitigate one or more effects of the suspected cyber-attack. Subsequently, the method 300 loops back to block 302 to again determine whether to continue detection of cyber-attacks.

Figure 6:
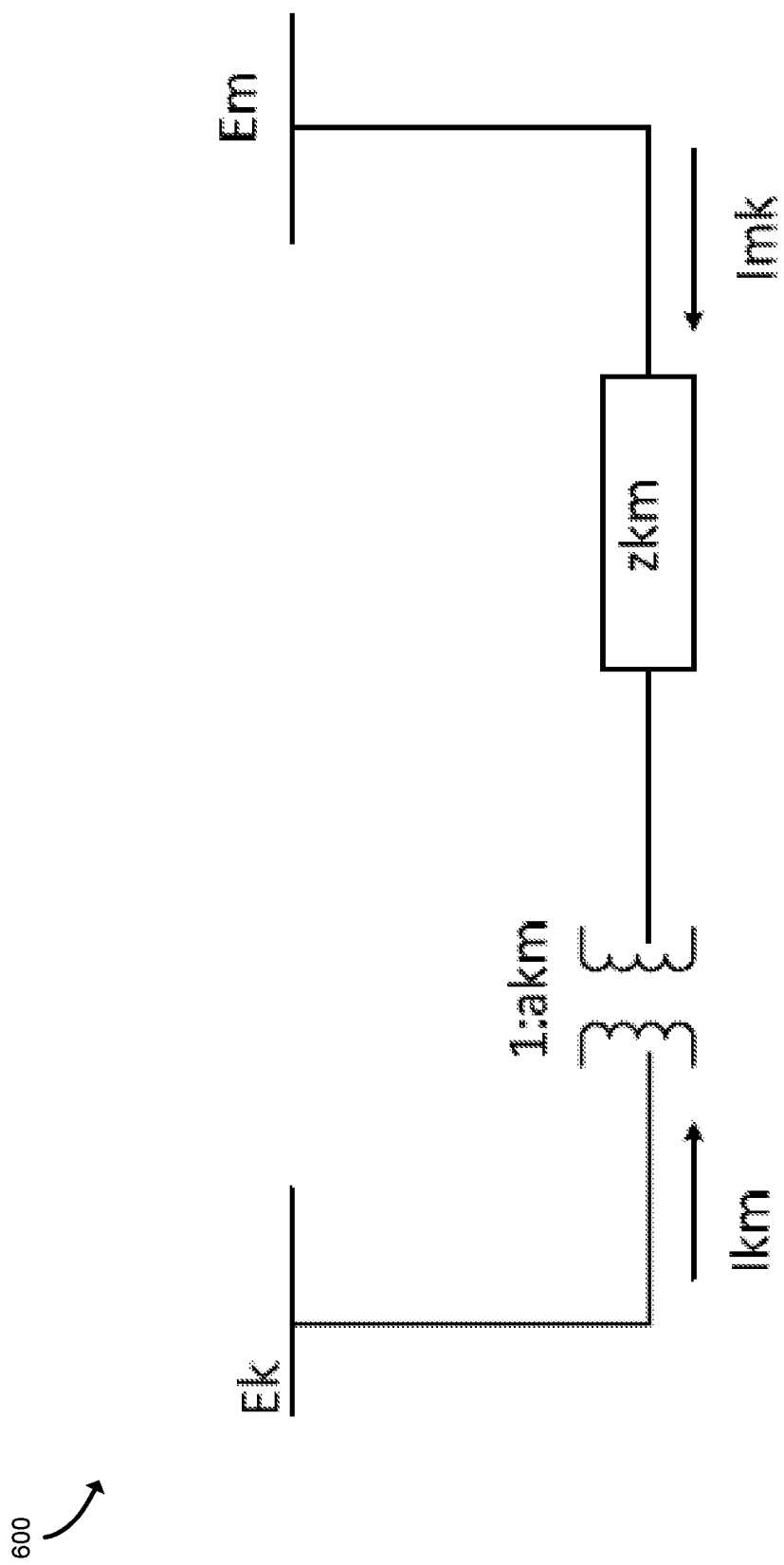
FIGS. 6-9 are simplified diagrams of transformer models that may be utilized by the controller of FIGS. 1 and 2 to detect cyber-attacks.

Referring now to FIG. 6, the controller 140 may utilize a static model 600 of a transformer (e.g., the transformer 110) with a tap changer connected between buses b and k. Potential cyber-attacks against the transformer 110 may include an attacker issuing a malicious control command to raise or lower the tap setting $a_{km}$ or an attacker injecting fabricated sensor measurements (e.g., a temperature of the coolant fluid and a load ratio). The result of the first type of attack may create an over or under voltage whereas the second type of attack may disrupt the transformer operation or condition-based estimations of the transformer's usable lifetime. The model 600 can be converted to a "pi" model with constants A, B, and C using the following equations:

$$A = a_{km} y_{km} \quad \text{(Equation 1)}$$

$$B = a_{km}(a_{km}-1) y_{km} \quad \text{(Equation 2)}$$

$$C = (1-a_{km}) y_{km} \quad \text{(Equation 3)}$$

Figure 7:
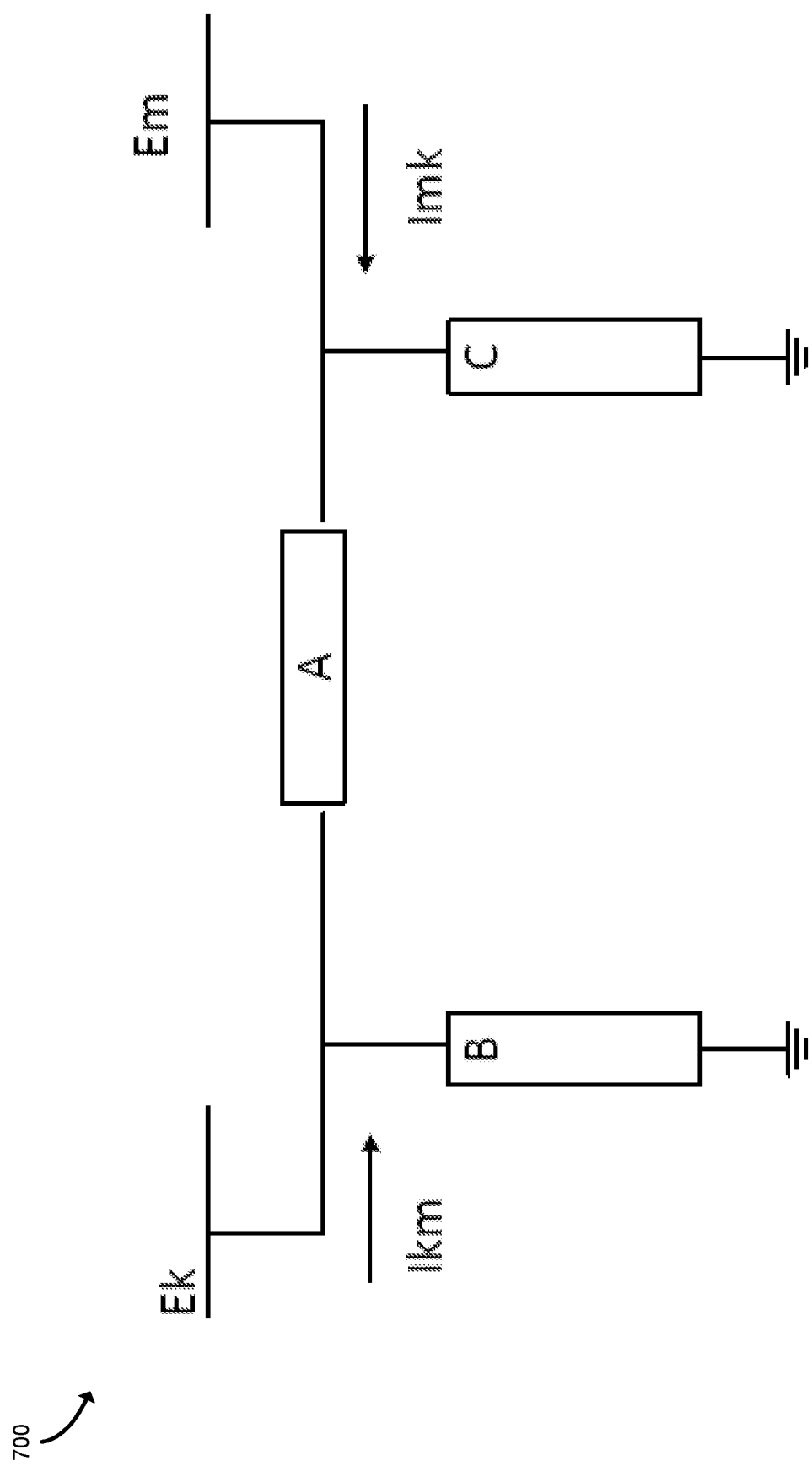
Figure 8:
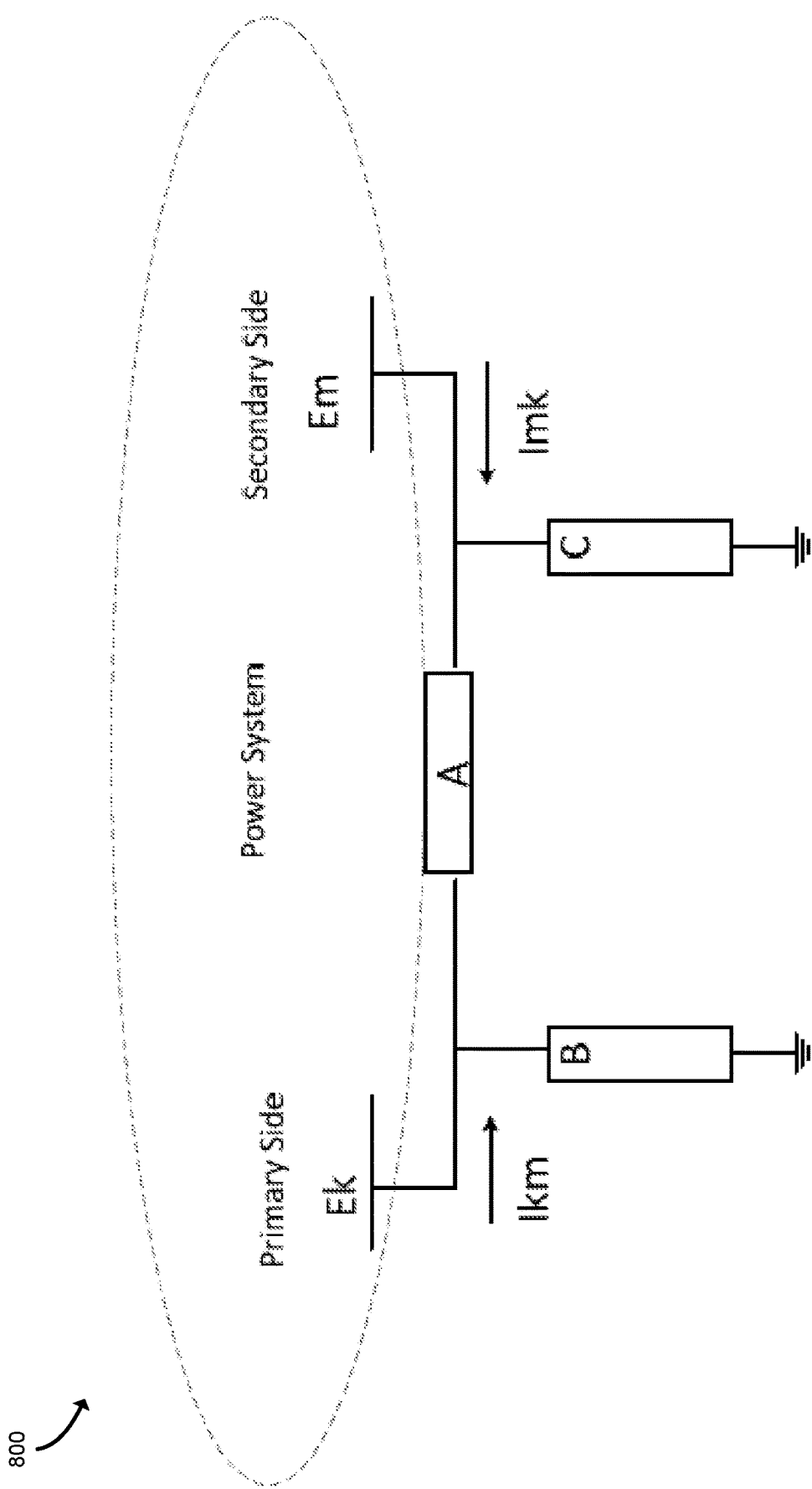

The resulting model 700 is shown in FIG. 7. Further, the model may be integrated with the physical system around the transformer, such as a substation or larger system, as shown in the model 800 of FIG. 8.

In some embodiments, as described above, the controller 140 may provide security against cyber-attacks based on transformer sensor measurements, such as electrical current and voltage. For example, a cyber attacker may inject malicious (i.e., false) current and voltage measurements into the sensors 150 on each side of the transformer 110. More specifically, referring back to the model 800 of FIG. 8, an attacker could corrupt both the voltage and current measurements at bus m. To guard against such an attack, the controller 140 may test the consistency of the measurements with the performance equations of the transformer 110. The relationship between the voltages and currents can be expressed as follows:

$$I_{km} = (A+B)E_k + (-A)E_m \quad \text{(Equation 4)}$$

$$I_{mk} = (-A)E_k + (A+C)E_m \quad \text{(Equation 5)}$$

Provided that there is no fault within the transformer 110, the algebraic sum of both the primary and secondary currents is theoretically equal to zero, as shown in the following equation:

$$0 = I_{km} + I_{mk} \quad \text{(Equation 6)}$$

In practice, equations (4)-(6) will not be satisfied due to the presence of noise in the measurements and minor changes to the transformer parameters. As such, the controller 140 may calculate residual quantities representing the mismatches according to the following equations:

$$d_1 = I_{km} - (A+B)E_k + (A)E_m \quad \text{(Equation 7)}$$

$$d_2 = I_{mk} + (A)E_k - (A+C)E_m \quad \text{(Equation 8)}$$

$$d_3 = I_{km} + I_{mk} \quad \text{(Equation 9)}$$

The relationships of equations (7)-(9) may be expressed in the following matrix relationship:

$$\begin{bmatrix} d_1 \\ d_2 \\ d_3 \end{bmatrix} = \begin{bmatrix} -(A+B) & A & 1 & 0 \\ A & -(A+C) & 0 & 1 \\ 0 & 0 & 1 & 1 \end{bmatrix} \begin{bmatrix} E_k \\ E_m \\ I_{km} \\ I_{mk} \end{bmatrix} \quad \text{(Equation 10)}$$

Further, the controller 140 may set thresholds for the residual values that define the maximum acceptable values for the residuals (e.g., an upper bound and a lower bound), as follows:

$$\begin{bmatrix} d_1 \\ d_2 \\ d_3 \end{bmatrix}_T = \begin{bmatrix} d_{1T} \\ d_{2T} \\ d_{3T} \end{bmatrix} \quad \text{(Equation 11)}$$

An attack on one of the measurements would appear as a violation of the thresholds (e.g., the measurements would fall outside the upper and lower bounds). More specifically, one or more of the elements would exceed the corresponding threshold according to the following equation:

$$\begin{bmatrix} d_1 \\ d_2 \\ d_3 \end{bmatrix} > \begin{bmatrix} d_{1T} \\ d_{2T} \\ d_{3T} \end{bmatrix} \text{ for some element } i, i = 1, 2, 3 \quad \text{(Equation 12)}$$

The controller 140, in such embodiments, identifies the violation of one of the elements of the residual matrix as a potential cyber-attack. The controller 140 may further determine which measurement is falsified. In doing so, the controller 140 may apply the following rules. First, a falsification of the primary current measurement $I_{km}$ would cause the residuals $d_1$ and $d_3$ to exceed their corresponding thresholds. Second, a falsification of the secondary current measurement $I_{mk}$ would cause the residuals $d_2$ and $d_3$ to exceed their thresholds. Third, a falsification of the primary voltage measurement $E_k$ would cause the residuals $d_1$ and $d_2$ to exceed their thresholds. Fourth, a falsification of the secondary voltage measurement $E_m$ would cause the residuals $d_1$ and $d_2$ to exceed their thresholds.

Figure 9:
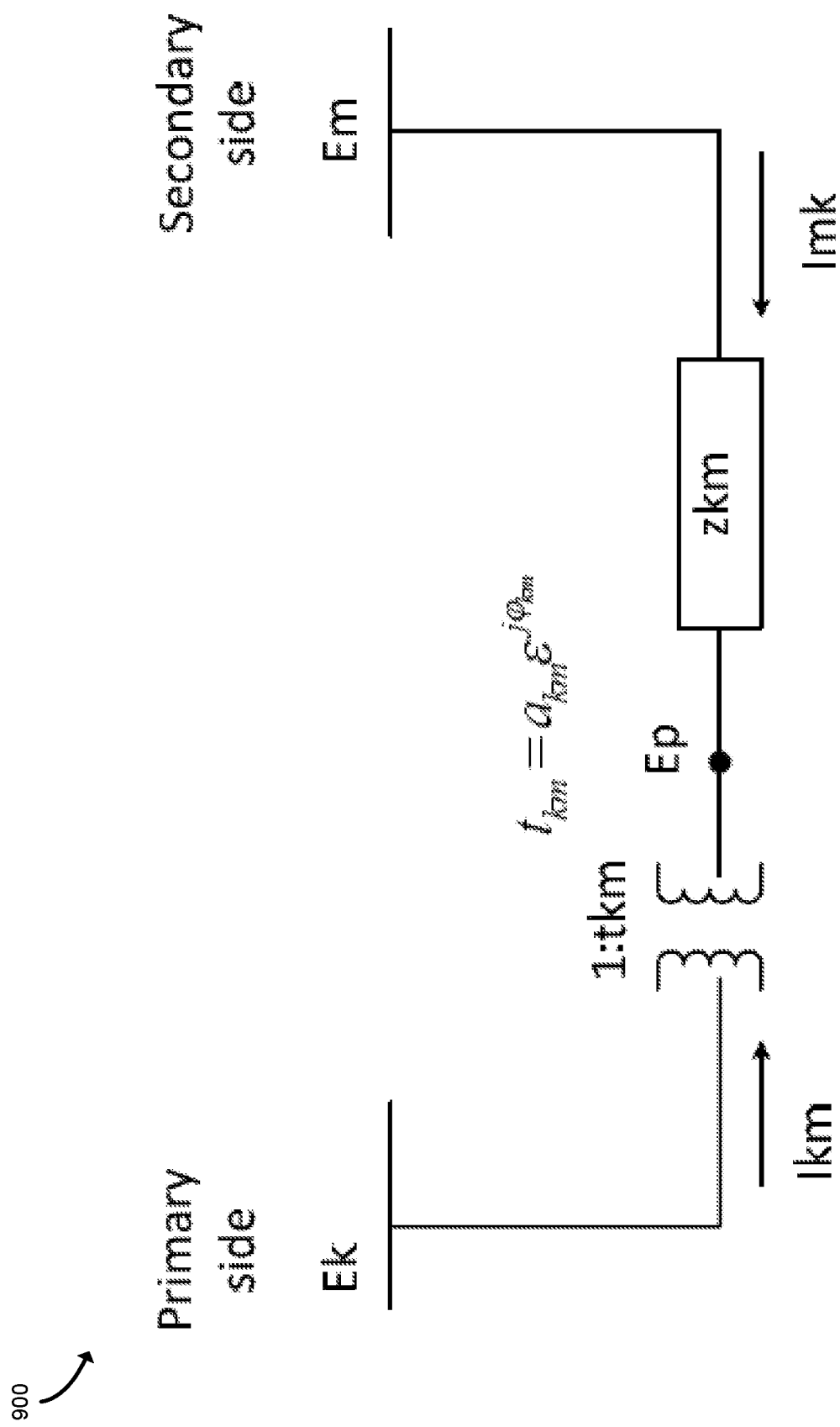

In embodiments in which a transformer (e.g., the transformer 110) is a phase shifting transformer, the controller 140 may provide security against cyber-attacks to the transformer 110 as described herein. Phase shifting transformers are typically used to control active power flows by changing the phase angle between the voltages across the transformer. Referring now to FIG. 9, in a model 900 that may be utilized by the controller 140 to detect a cyber-attack against the transformer 110, a turns ratio $t_{km}$ is embodied as a ratio of the complex voltages $E_p$ and $E_k$. The turns ratio is defined as a complex quantity with magnitude $a_{km}$ and angle $\varphi_{km}$. As such, the complex voltage at an internal point p is expressed in the following equation:

$$t_{km} = \frac{E_p}{E_k} = a_{km} e^{j\varphi_{km}} \quad \text{(Equation 13)}$$

Accordingly, the angle of the voltage at point p is shifted by the phase angle of the transformer as follows:

$$\theta_p = \theta_k + \varphi_{km} \quad \text{(Equation 14)}$$

$$V_p = a_{km} V_k \quad \text{(Equation 15)}$$

The physical relationship of the primary and secondary currents may be expressed in terms of the complex terms ratio, as follows:

$$\frac{I_{km}}{I_{mk}} = -t^*_{km} = -a_{km} e^{-j\varphi_{km}} \quad \text{(Equation 16)}$$

The currents may be expressed in terms of the voltages and the impedance of the transformer as follows:

$$I_{km} = -t_{km} y_{km} (E_m - E_p) \quad \text{(Equation 17)}$$

$$I_{mk} = y_{mk} (E_m - E_p) \quad \text{(Equation 18)}$$

The currents can also be expressed in terms of the terminal voltages of the transformer 110, as follows:

$$I_{km} = a_{km}^2 y_{km} E_k - t_{km} y_{km} E_m \quad \text{(Equation 19)}$$

$$I_{mk} = -t_{km} y_{km} E_k + y_{km} E_m \quad \text{(Equation 20)}$$

$$d_1 = I_{km} - a_{km}^2 y_{km} E_k + t_{km} y_{km} E_m \quad \text{(Equation 21)}$$

$$d_2 = I_{mk} + t_{km} y_{km} E_k - y_{km} E_m \quad \text{(Equation 22)}$$

$$d_3 = I_{km} + I_{mk} \quad \text{(Equation 23)}$$

The equations (21)-(23) may be expressed in matrix form, as follows:

$$\begin{bmatrix} d_1 \\ d_2 \\ d_3 \end{bmatrix} = \begin{bmatrix} -a_{km}^2 y_{km} & t_{km} y_{km} & 1 & 0 \\ t_{km} y_{km} & -y_{km} & 0 & 1 \\ 0 & 0 & 1 & 1 \end{bmatrix} \begin{bmatrix} E_k \\ E_m \\ I_{km} \\ I_{mk} \end{bmatrix} \quad \text{(Equation 24)}$$

The controller 140 may apply thresholds (e.g., upper and lower bounds) for the residual values as follows:

$$\begin{bmatrix} d_1 \\ d_2 \\ d_3 \end{bmatrix}_T = \begin{bmatrix} d_{1T} \\ d_{2T} \\ d_{3T} \end{bmatrix} \quad \text{(Equation 25)}$$

A falsification of the measurements would result in a violation of threshold values. More specifically, one or more of the elements $d_1$, $d_2$, or $d_3$ would exceed its corresponding threshold, as follows:

$$\begin{bmatrix} d_1 \\ d_2 \\ d_3 \end{bmatrix} > \begin{bmatrix} d_{1T} \\ d_{2T} \\ d_{3T} \end{bmatrix} \text{ for some element } i, i = 1, 2, 3 \quad \text{(Equation 26)}$$

Accordingly, the controller 140 may apply the four rules described above to determine which measurement or measurements (e.g., the primary current $I_{km}$, the secondary current $I_{mk}$, the primary voltage $E_k$, or the secondary voltage $E_m$) have been falsified in a cyber-attack.

In some embodiments, the controller 140 may provide security against cyber-attacks on sensor measurements using local complementary sensor confirmation. For example, in the attack scenario described above, confirmation of a change in the electrical current can be obtained by comparing the measurements of complementary sensors 150 (e.g., a temperature at the top of the coolant fluid tank and a temperature at the bottom of the coolant fluid tank 160). The controller 140 may also obtain one or more temperatures that are not directly measured, but instead are calculated from other temperatures. For example, the controller 140 may calculate a winding hot spot temperature in the transformer 110 as a function of temperature measurements from the top and/or bottom of the coolant fluid tank 160. For fluid-cooled transformers, calculation of the winding hot spot temperature may depend on electrical current, ambient temperature, the type of cooling fluid, and physical parameters of the transformer provided from design calculations and/or test data. Other calculated temperature values may be provided from a combination of measured sensor data, subscribed information, and/or transformer physical properties. The controller 140 may provide an additional layer of security against cyber-attacks by verifying changes in related measured temperature values and calculated temperature values. Current-dependent calculated temperature values would be affected by falsified electrical current data while directly measured temperature values may not be falsified. Accordingly, a calculated value such as the winding hot spot temperature may be compared to the temperature at the top of the coolant fluid tank 160 in terms of either absolute temperature rise over a given time interval or an instantaneous rate of change with respect to the measurement time interval for the measured and calculated values. The controller 140 may utilize the following equations in such a process:

$$T_{Rise,calc} | I_{pu}, T_a \propto T_{Rise,meas} \quad \text{(Equation 27)}$$

In the above equation, $T_{Rise,calc}$ and $T_{Rise,meas}$ represent generic related measured and calculated temperatures. The $T_{Rise,calc}$ also specifies a given per unit current, $I_{pu}$, and ambient temperature, $T_a$, for comparison purposes. The calculation is then dependent upon per unit current, $I_{pu}$, and ambient temperature $T_a$. The confirmation process based on local complementary sensors may include performing the evaluation over a variable time span, depending on the polling interval of temperature and current sensors (e.g., the sensors 150). Alternatively, a limit may be taken to express a set of temperature characteristics over an instantaneous timeframe, as follows:

$$\frac{dT_{Rise,calc}}{dt} | I_{pu}, T_a \propto \frac{dT_{Rise,meas}}{dt} \quad \text{(Equation 28)}$$

An example of the above relationship is given as follows for the proportional relationship between a calculated winding hotspot temperature, $T_{Rise,calc}|I_{pu}, T_a = \Theta_H$, and a measured temperature, $T_{Rise,meas} = \Theta_{TO}$ from the top of the coolant fluid tank 160:

$$\Theta_H = \left[\left(\Delta\Theta_{H,R} \cdot I_{pu}^{2 \cdot \Delta\Theta_{H,exp}} - \Theta_{H,i}\right) \cdot \left(1 - e^{\frac{60}{2 \cdot \tau_w}}\right) + \Theta_{H,i}\right] + \Theta_{TO} \quad \text{(Equation 29)}$$

$$\Delta\Theta_{H,U} = \left[\left(\Delta\Theta_{H,R} \cdot I_{pu}^{2 \cdot \Delta\Theta_{H,exp}} - \Theta_{H,i}\right) \cdot \left(1 - e^{\frac{60}{2 \cdot \tau_w}}\right) + \Theta_{H,i}\right] \quad \text{(Equation 30)}$$

$$\Theta_H = \Delta\Theta_{H,U} + \Theta_{TO} \quad \text{(Equation 31)}$$

In the above equations, $\Theta_H$ represents a calculated winding hotspot temperature at the present time instant, $\Theta_{H,i}$ represents a calculated winding hotspot temperature at a previous time instant, $\Delta\Theta_{H,R}$ represents a hotspot differential temperature at rated load, $I_{pu}$ represents per unit current, $\Delta\Theta_{H,exp}$ represents a hotspot differential temperature exponent, and $\tau_w$ represents a hotspot time constant in minutes.

In some embodiments, the controller 140 additionally analyzes a harmonic content of the electrical current. The harmonic content is an additional component of the electrical current that has a frequency larger than that of the nominal current (e.g., 50 or 60 Hz) that sums together with the nominal or fundamental frequency component in terms of superposition. Typically, the frequencies are at integer multiples of the nominal or fundamental component. However, non-linearity of the system may lead to frequencies between the integer multiples. The harmonic components can contribute additional generated heat as certain types of losses within the transformer, such as eddy current losses, which are proportional to the square of the frequency. In some embodiments, the controller 140 may apply a threshold of 5% total harmonic distortion, the ratio of fundamental current to other harmonic components. That is, if harmonics are above the threshold, an additional factor for computation may be determined (e.g., pursuant to the Institute of Electrical and Electronics Engineers (IEEE) standard C57.110 or other related standards) such that the calculated temperature is scaled by the additional losses due to harmonics. An example calculation for winding hotspot rise over the temperature of the top of the coolant fluid tank 160 is given below:

$$\Theta_g = \Theta_{g\text{-}R} \times \left(\frac{P_{LL}(pu)}{P_{LL\text{-}R}(pu)}\right)^{0.8} [C] \quad \text{(Equation 32)}$$

$$\Theta_g = \Theta_{g\text{-}R} \times \left(\frac{1 + F_{HL} \times P_{EC\text{-}R}(pu)}{1 + P_{EC\text{-}R}(pu)}\right)^{0.8} [C] \quad \text{(Equation 33)}$$

In the above equations, $\Theta_g$ represents the adjusted winding hotspot rise over the temperature of the top of the coolant fluid tank 160 in degrees Celsius, $\Theta_{g\text{-}R}$ is the rated winding hotspot rise over the temperature of the top of the coolant fluid tank 160 in degrees Celsius, $P_{LL}(pu)$ is the per unit power loss under load calculated with harmonic loss contribution, and $P_{LL\text{-}R}(pu)$ is the per unit loss under rated conditions. Additionally, $F_{HL}$ is a defined harmonic loss factor for winding eddy current losses and $P_{EC\text{-}R}$ is the per unit winding eddy current loss under rated conditions. Here, the conditions of the above equations could be taken as the rate winding hotspot rise over the temperature of the top of the coolant fluid tank 160, $\Theta_{g\text{-}R}$.

In other embodiments, the controller 140 may determine a lifetime estimate of the transformer 110 (e.g., an estimate of the usable lifetime of the transformer 110). In such embodiments, the controller 140 performs a comparison of the calculated estimated lifetime over a given timespan to the measured temperature value for proportionality, instead of the generic calculated temperature. The controller 140 may also utilize threshold limits on estimated lifetime accrual within a given timespan, based on either future current and temperature rise limits or historical data. This alternative condition is expressed as follows in terms of both an instantaneous or absolute time interval approach:

$$Faa_{Rise,calc} \mid I_{pu}, T_a, T_{hotspot} \propto T_{Rise,meas} \quad \text{(Equation 34)}$$

$$\frac{dFaa_{Rise,calc}}{dt} \mid I_{pu}, T_a, T_{hotspot} \propto \frac{dT_{Rise,meas}}{dt} \quad \text{(Equation 35)}$$

In the above equations, Faa expresses the output of an age acceleration factor or calculated lifetime estimate over a given time. It is important to note that the temperature measurement from a the sensors 150 may be sampled less frequently than the current or voltage measurements (e.g., intervals of several seconds for temperature versus intervals of several milliseconds for current and/or voltage). However, as cyber-attacks grow increasingly complex, the incubation or infiltration period of an attack may be days or weeks long.

Figure 10:
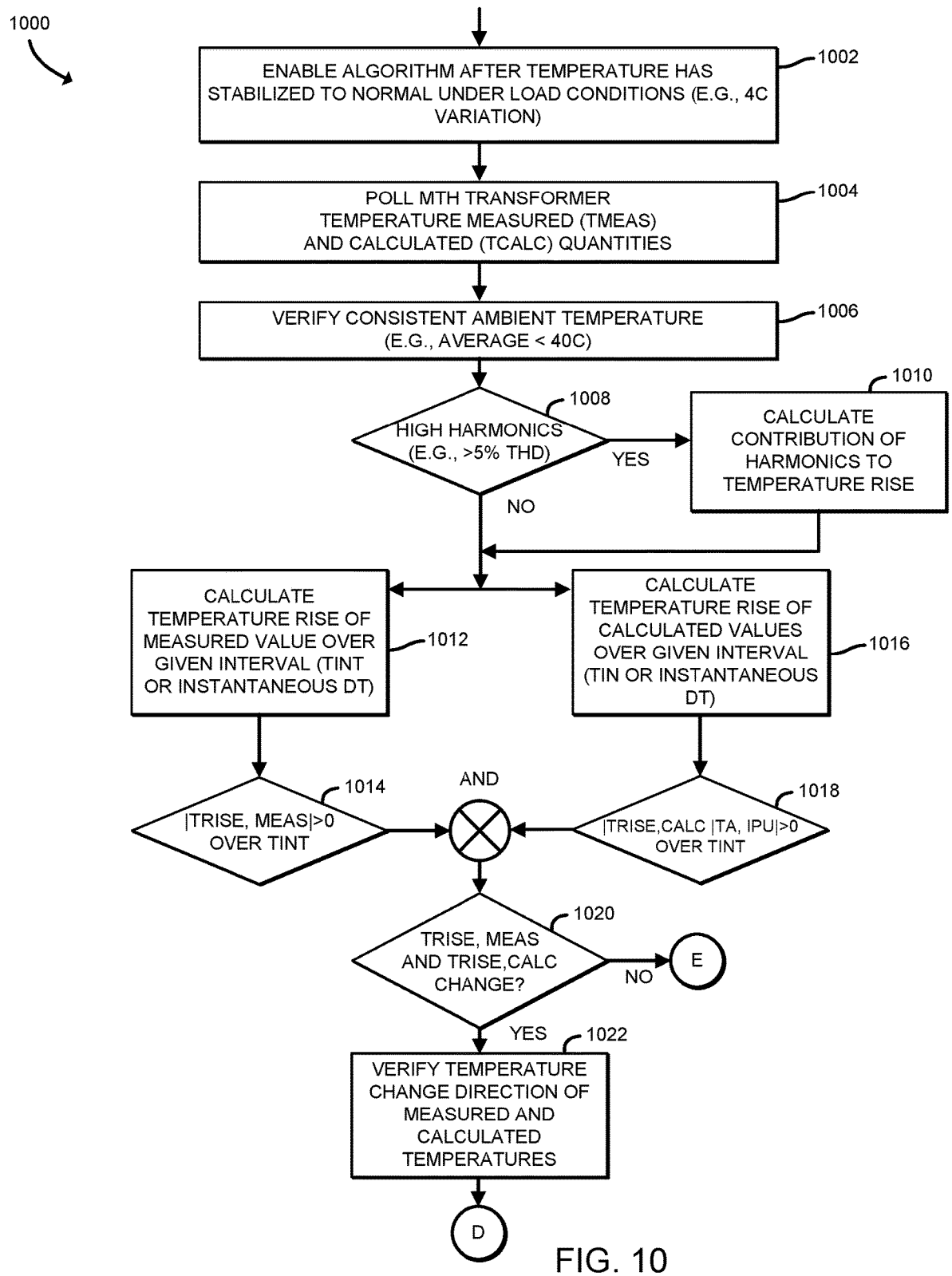
FIGS. 10-11 are a simplified diagram of at least one embodiment of a method for detecting cyber-attacks based on local complementary sensor confirmation that may be performed by the controller of FIGS. 1 and 2.

Referring now to FIG. 10, the controller 140 may perform a method 1000 for detecting cyber-attacks based on local complementary sensor confirmation, using the operations described above. In the illustrative embodiment, the method 1000 begins with block 1002, in which the controller 140 enables the algorithm after a temperature associated with the transformer 110 has stabilized under load conditions (e.g., the temperature varies by 4 degrees or less). Subsequently, the method 1000 advances to block 1004 in which the controller 140 obtains the measured temperature $T_{meas}$ (e.g., by polling the sensors 150) and corresponding calculated temperature(s), $T_{calc}$. Afterwards, the controller 140 verifies a consistent ambient temperature (e.g., an average ambient temperature of less than 40 degrees Celsius), as indicated in block 1006. In block 1008, the controller 140 determines whether a relatively high amount of harmonic distortion is present (e.g., greater than 5%). If so, the method 1000 advances to block 1010 in which the controller 140 calculates the contribution of harmonics to temperature rise. Subsequently, or if relatively high harmonics are not present, the method advances to concurrently perform blocks 1012 and 1016. In block 1012, the controller 140 calculates a rise of the measured temperature over a given time interval, or an instantaneous temperature rise. In block 1016, the controller 140 calculates a rise of calculated temperature values over a given time interval, or an instantaneous rise in the calculated temperature values. Subsequently, the controller 140 determines, in block 1014, whether the temperature rise is greater than zero and determines, in block 1018, whether the calculated temperature rise is greater than zero. The controller 140 combines the results of blocks 1014 and 1018 in block 1020 with an AND operation. That is, the controller 140 determines whether there was a change in both the measured temperature and the calculated temperature. If so, the method 1000 advances to block 1022 in which the controller 140 verifies the temperature change direction for the measured and calculated temperatures. Subsequently, the method 1000 advances to blocks 1024 and 1030 of FIG. 11.

Figure 11:
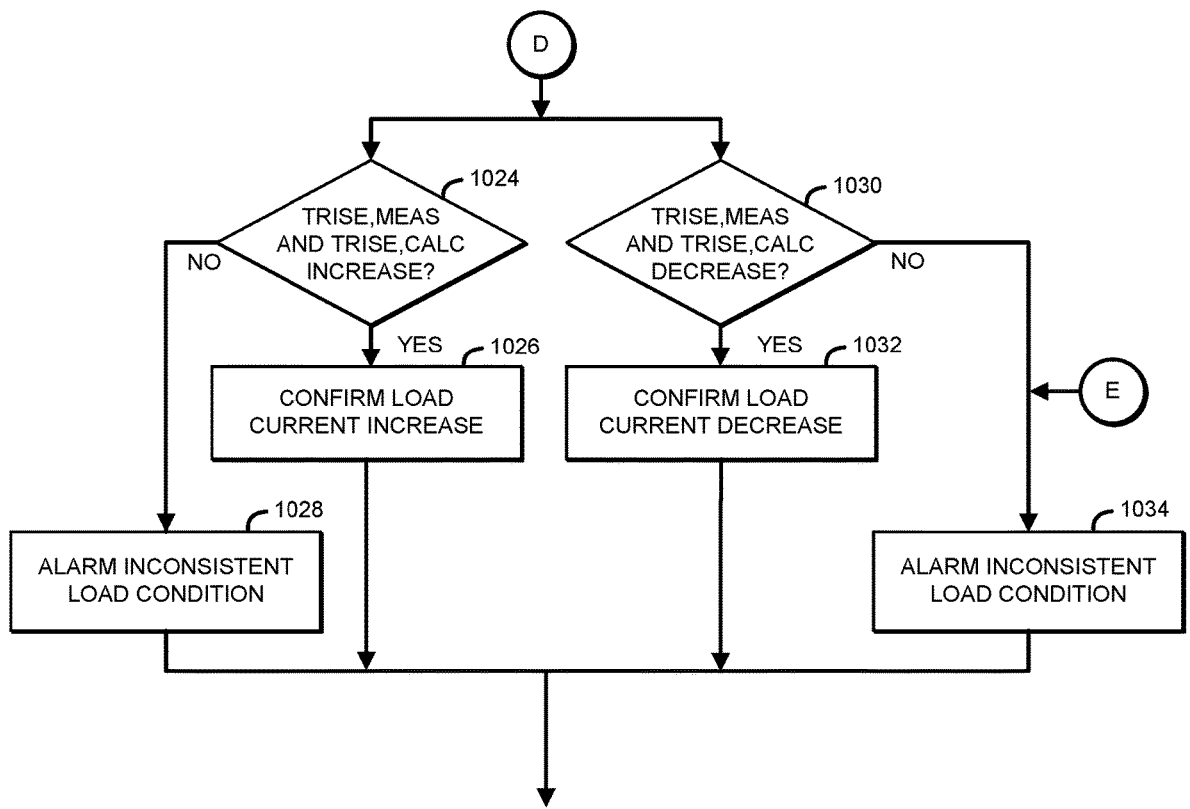

Referring now to FIG. 11, in block 1024, the controller 140 determines whether both the measured temperature and the calculated temperature increased. If so, the method 1000 advances to block 1026, in which the controller 140 determines that a load current actually did increase. If not, the method 1000 advances to block 1028, in which the controller 140 generates an alarm indicative of an inconsistent load condition (e.g., a potential cyber-attack). In block 1030, which may be performed concurrently with block 1024, the controller 140 determines whether the measured temperature and calculated temperature both decreased. If so, then the controller 140, in the illustrative embodiment, confirms that there was a load current decrease, as indicated in block 1032. Otherwise, or if the controller 140 determined in block 1020 that the measured temperature and the calculated temperature did not both change, the method advances to block 1034 in which the controller generates an alarm of an inconsistent load condition (e.g., a potential cyber-attack).

Figure 12:
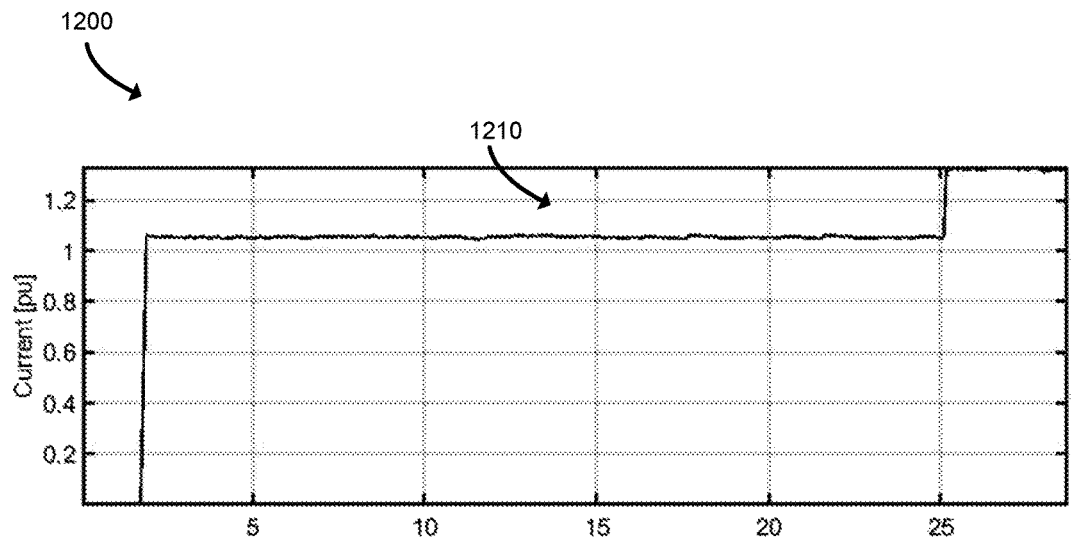
FIGS. 12-13 are plots of a change in the load of a transformer and a corresponding change in temperature of the transformer.
Figure 13:
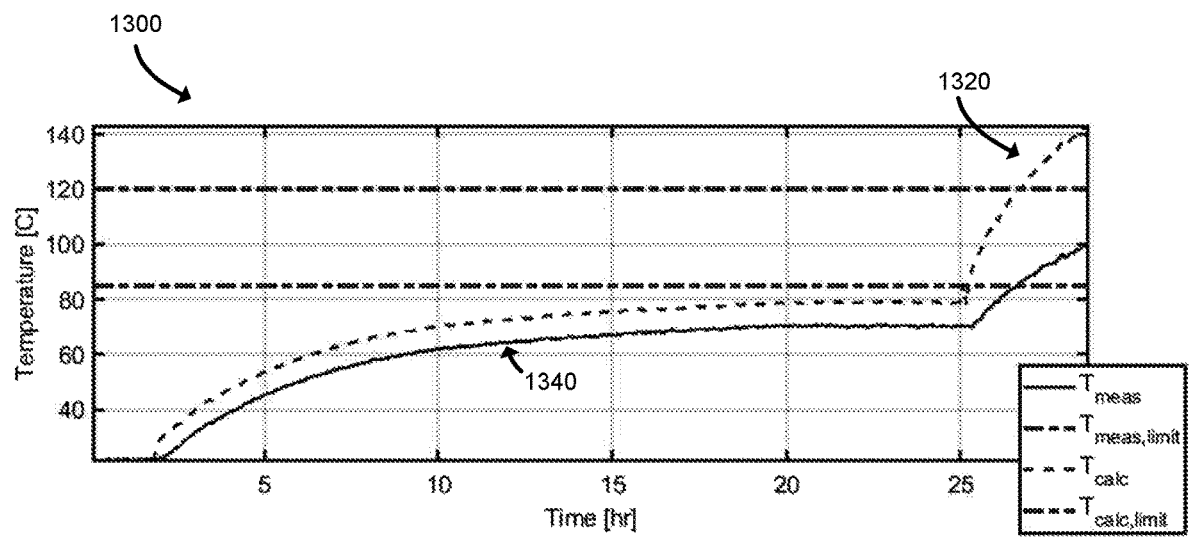

Referring now to FIGS. 12 and 13, a normal operating condition and a condition where falsified current may be detected by the controller 140 are shown. The normal operating conditions are those in which load is applied to a transformer (e.g., the transformer 110) and a subsequent temperature rise is identified, due to rate current followed by an increase in the current over the rated conditions. The temperature rise is reflected both in the temperature 1340 at the top of the coolant fluid tank 160, $T_{Rise,meas}=\Theta_{TO}$ and the calculated winding hotspot temperature 1320, $T_{Rise,calc}|I_{pu}$, $T_a=\Theta_H$. The relationship follows equations (29) and (31), in which a standard defined rise over the temperature at the top of the coolant fluid tank 160 is calculated by the controller 140 to provide an estimated temperature of the winding hotspot. As shown in the plot 1200 of FIG. 12, the current 1210 has risen over time, resulting in the increased measured and calculated temperatures in the plot 1300 of FIG. 13.

Figure 14:
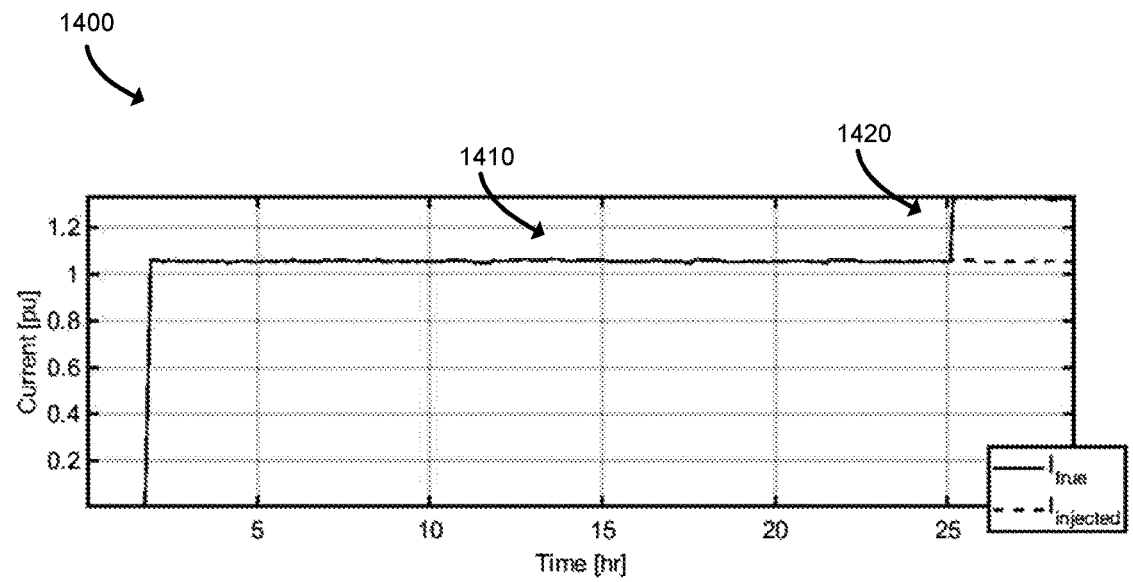
FIGS. 14-15 are plots of a change in the load of a transformer and a temperature rise difference between calculated and measured temperature values.
Figure 15:
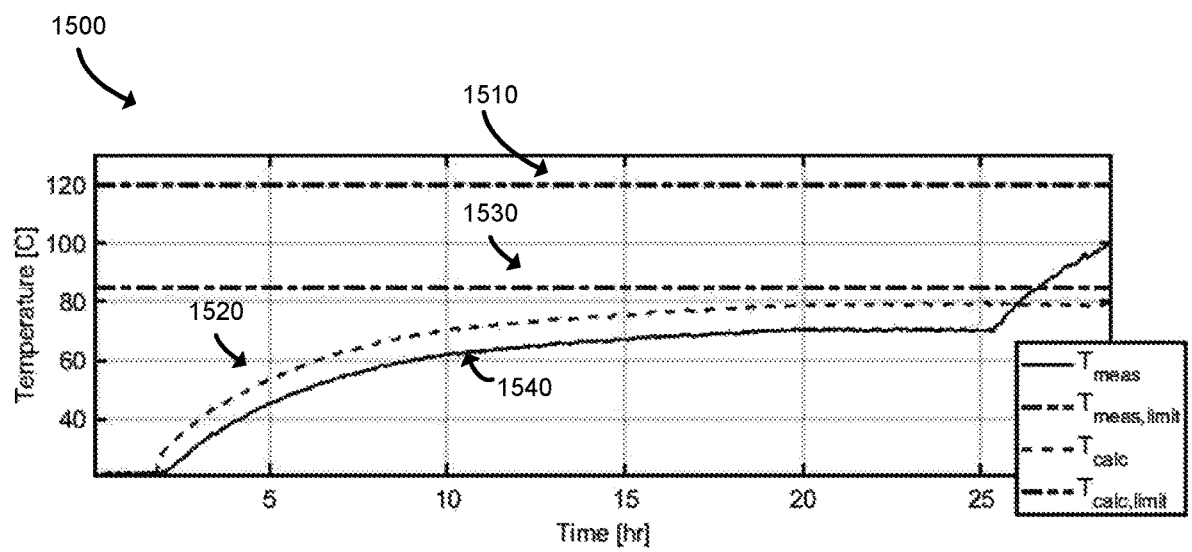

Referring now to FIGS. 14 and 15, an example attack scenario may involve an attacker causing falsified current measurements to be reported. The falsified current measurements 1410 in the plot 1400 indicate a current that would be expected under the rated load of the transformer. However, the transformer is actually in an overload condition, as indicated by the current values 1420. As such, the purpose of the cyber-attack is to prevent the transformer from initiating a cooling process. Example thermal limits 1510, 1530 are given for both the measured temperature of the top of the coolant fluid tank 160 and the calculated winding hotspot temperature, based on standards for the given transformer insulation materials. After the temperature change has stabilized, the false injected current value 1410 is shown as an input to the calculated winding hotspot temperature 1520 and the relationship provided in equations (29) and (31) no longer remains true, due to the increase in the measured temperature 1540 while the calculated temperature 1520 remains unchanged. When evaluating the above logic with the provided attack scenario, the output of the calculated temperature value will not change, while the measured output will increase, leading to the generation of an alarm condition indicating inconsistent load conditions.

In some embodiments, the controller 140 performs operations to secure a transformer against cyber-attacks in which temperature sensor measurements are faked. Normally, the output power of a transformer is less than its input power. Generally, the difference is the amount of power converted into heat by core loss, winding losses, and stray losses. A combination of radiation and convection dissipate the heat from the exposed surfaces of the transformer. As such, the controller 140, in some embodiments, may check the consistency of the characteristic temperature measurements with the input and output power of the transformer (e.g., the transformer 110), based on the following equations:

$$P_{total\ loss}^m \propto C_{hotspot}^m | T_{oil\ temp} \propto C_{oil\ temp}^m | T_{ambient} \quad \text{(Equation 36)}$$

$$P_{in\text{-}out}^2 = \Sigma_{t_1}^{t_2} E_k(t) \cdot I_k(t) \cdot dt - \Sigma_{t_1}^{t_2} E_m(t) \cdot I_m(t) \cdot dt \quad \text{(Equation 37)}$$

$$P_{in\text{-}out}^m \cong P_{total\ loss}^m \quad \text{(Equation 38)}$$

In the above equations, $P_{in\text{-}out}^m$ represents the measured proportionality of input and output power of the $m^{th}$ transformer at different points of temperature or load current and $C_{oil\ temp}^m$ and $C_{hotspot}^m$ indicate an official characteristic of input and output power of the $m^{th}$ transformer given by a measured temperature (e.g., from the sensors 150) or information provided by a weather service or other source. By using the above equations, the transformer 110 may detect an abnormal behavior (e.g., a cyber-attack) if the measured proportion of input and output power is not consistent with the official characteristic, when the measured temperature of the transformer is normal (e.g., the expected temperature, given the present load). As an example, the total losses of the system can be expressed as follows:

$$P_{total\ loss}^m = P_{LL} = P(C_{hotspot}^m) + F_{HL}(I_m) \times P_{EC} + F_{HL\text{-}STR}(I_m) \times P_{OSL} \quad \text{(Equation 39)}$$

$$P_{total\ loss}^m = P_{LL} = I_m^2 \cdot R(C_{hotspot}^m) + F_{HL}(I_m) \times P_{EC} + F_{HL\text{-}STR}(I_m) \times P_{OSL} \quad \text{(Equation 40)}$$

In the above equations, $P_{LL}$ represents real time load losses calculated from I2R or load losses, eddy current loses ($P_{EC}$), and other stray losses ($P_{OSL}$). The load losses are a function of the temperature-dependent winding resistance value (e.g., values defined in IEEE C57.12.90) and measured current. Eddy current and other stray losses are given as a function of a harmonic loss coefficient, such as defined in IEEE C57.111, and are dependent on load current. The characteristic temperature used in estimation of the real time load losses can be determined from IEEE C57.91, IEC 60076-7, or a similar standard, from either ambient temperature or a characteristic coolant fluid temperature, as shown in equations (31) and (33). The following equations represent a set of example power-dependent temperature characteristics, according to IEEE C57.91, from ambient temperature:

$$K = I_m(\Delta t)/I_{m,rated} \quad \text{(Equation 41)}$$

$$R = P_{NL,R}/P_{LL,R} \quad \text{(Equation 42)}$$

$$\tau_{oil,rated}\frac{d\Theta_{oil}}{dt} = \left(\frac{1+RK^2}{1+R}\right)^n \Delta\Theta_{oil,rated} - (\Theta_{oil} - \Theta_{ambient}) \quad \text{(Equation 43)}$$

$$C_{oil\ temp}^m = \tau_{winding,rated}\frac{d\Theta_{hotspot}}{dt} = \left(\frac{1+RK^2}{1+R}\right)^m \Delta\Theta_{hotspot,rated} - (\Theta_{hotspot} - \Theta_{oil}) \quad \text{(Equation 44)}$$

In the above equations, $I(\Delta t)$ is representative of the transformer load current for a given time interval, $\Theta_{ambient}$ is representative of the ambient temperature, $P_{NL,R}$ is representative of rated no load losses at a specific ambient temperature (e.g., 75 C), and $P_{LL,R}$ represents rated load losses calculated from I2R, eddy losses, and other stray losses. One output is $T_{oil}(\Delta t)$, which is representative of the transformer oil temperature (i.e., the temperature of the coolant fluid) derived from measured top or bottom temperatures in the coolant fluid tank 160, or a top/bottom relationship equation. Another output is $\tau_{hotspot}(\Delta t)$, which is representative of the transformer hotspot temperature. The transformer 110 may perform a comparison of $P_{in\text{-}out}^m$ and $P_{total\ loss}^m$ within given tolerances to determine whether the power balance given from measured voltage and current values (e.g., from the sensors 150) match the total loss calculations from the measured temperature(s) and other dependencies.

Figure 16:
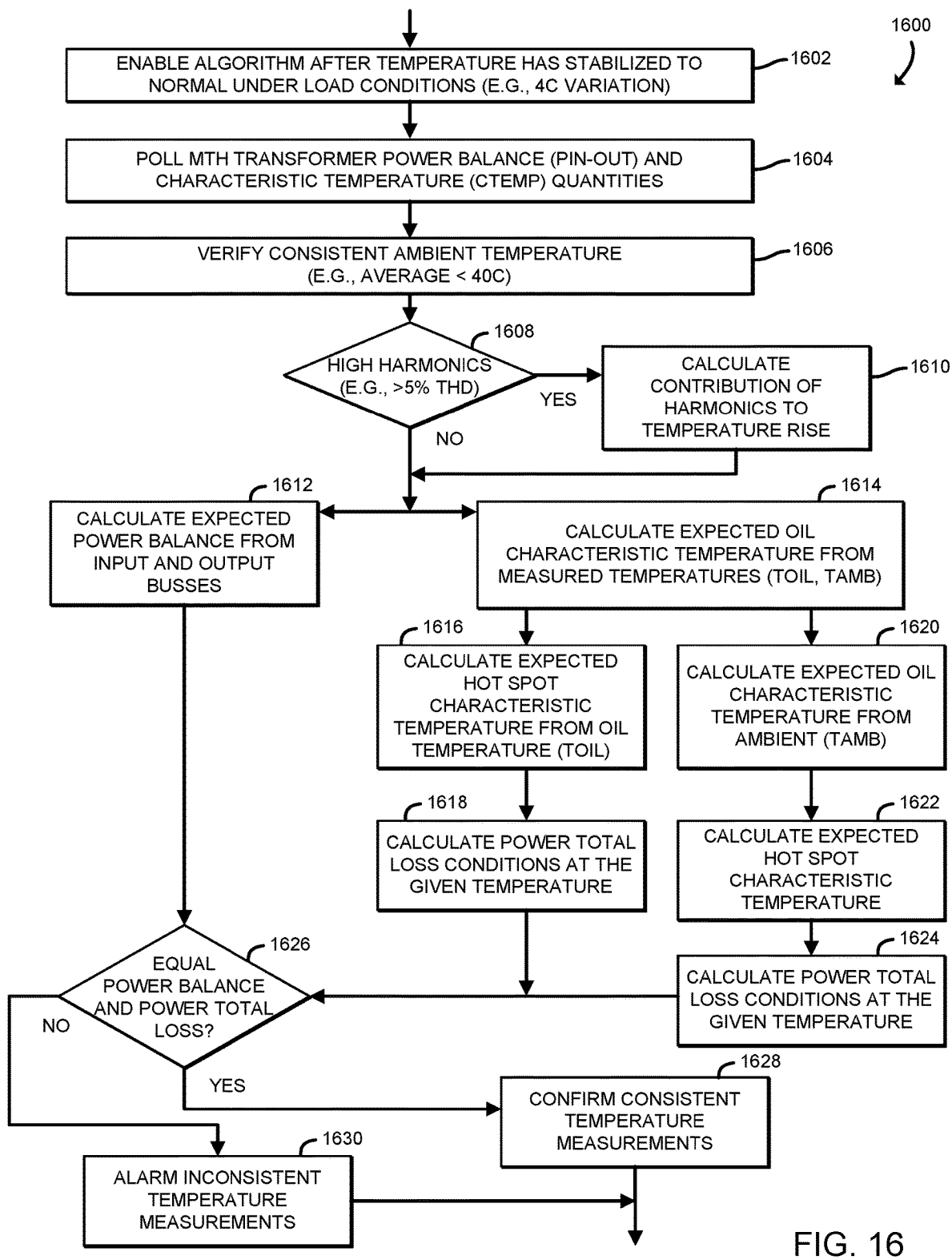
FIG. 16 is a simplified flow diagram of at least one embodiment of a method for detecting a cyber-attacks based on transformer temperature sensor measurements.

Referring now to FIG. 16, a method 1600 utilizing the above equations for detecting a cyber-attacks based on transformer temperature sensor measurements begins with block 1602, in which the controller 140 enables the algorithm after the temperature has stabilized to normal load conditions (e.g., the temperature varies by 4 degrees or less). Subsequently, the controller 140 determines the power balance ($P_{in\text{-}out}$) and characteristic temperature ($C_{temp}$) quantities, as indicated in block 1604. Afterwards, the controller 140 verifies that the ambient temperature associated with the transformer (e.g., the transformer 110) is consistent (e.g., that the ambient temperature has an average below 40 degrees Celsius), as indicated in block 1606. In block 1608, the controller determines whether a relatively high amount of harmonic distortion (e.g., greater than 5%) is present. If so, the method 1600 proceeds to block 1610 in which the controller 140 calculates the contribution of the harmonics to the temperature rise, similar to block 1010 of FIG. 10. Subsequently, or if the controller 140 determined in block 1608 that relatively high harmonic distortion is not present, the method 1600 advances to blocks 1612 and 1614, which the controller 140 may perform concurrently. In block 1612, the controller 140 calculates the expected power balance from the input and output buses. In block 1614, the controller 140 calculates the expected characteristic temperature of the coolant fluid in the coolant fluid tank 160 from measured temperatures (e.g., $T_{oil}$ and $T_{ambient}$). In block 1616, the controller 140 calculates the expected hotspot characteristic temperature from the coolant fluid temperature (e.g., the oil temperature $T_{oil}$). Further, in block 1618, the controller 140 calculates power total loss conditions using the given temperature. In block 1620, the controller 140 calculates the expected coolant fluid characteristic temperature from the ambient temperature, and in block 1622, the controller 140 calculates the expected hotspot characteristic temperature using the calculated expected coolant fluid characteristic temperature. Additionally, the controller 140 calculates the power total loss conditions at the given temperature, in block 1624. In block 1626, the controller 140 determines whether an equal power balances and power total loss is present. If so, the method 1600 advances to block 1628, in which the controller 140 confirms that consistent temperature measurements are present. Otherwise, the method 1600 advances to block 1630 in which the controller 140 generates an alarm indicative of inconsistent temperature measurements (e.g., a potential cyber-attack).

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A method for securing a transformer, the method comprising:
   determining, by a controller of the transformer, a plurality of measured values of a first operational parameter of the transformer based upon one or more signals received from one or more sensors of the transformer, the first operational parameter comprising a temperature associated with the transformer, the plurality of measured values comprising a first measured value;
   comparing the plurality of measured values to each other;
   determining, by the controller based on the comparison, whether the plurality of measured values have stabilized to a predefined load condition;
   determining, by the controller, a second measured value of a second operational parameter of the transformer based upon one or more signals received from the one or more sensors of the transformer;
   calculating, by the controller, a first expected value of the first operational parameter in response to a determination that that the plurality of measured values have stabilized to the predefined load condition, wherein the calculating is based on the second measured value of the second operational parameter and a model of the transformer that relates the first and second operational parameters;
   comparing, by the controller, the first measured value of the first operational parameter to the first expected value of the first operational parameter;
   determining, by the controller, a residual value indicative of an effect of noise on a measurement of at least one of the first and second operational parameters of the transformer;
   determining, by the controller, whether the residual value is within a predefined upper bound and a predefined lower bound;
   identifying, by the controller, that the transformer is subject to a cyber attack when:
      a difference between the first measured value and the first expected value exceeds a first threshold, and
      the residual value is not within the predefined upper bound and the predefined lower bound;
   calculating, by the controller, an expected oil characteristic temperature from at least one of an ambient temperature, an oil temperature from a top of a tank, or an oil temperature from a bottom of the tank;
   calculating, by the controller, an expected hot spot characteristic temperature from the at least one of the ambient temperature, the oil temperature from the top of the tank, or the oil temperature from the bottom of the tank;
   calculating, by the controller, expected power total loss conditions at the expected hot spot characteristic temperature;
   comparing, by the controller, an expected power balance and an expected power total loss;
   determining, by the controller, whether the difference between the expected power balance and the expected power total loss exceeds a predetermined threshold; and
   executing a corrective action in response to a determination that the difference between the expected power balance and the expected power total loss exceed the predetermined threshold to mitigate an effect of the difference between the expected power balance and the expected power total loss, the corrective action comprising at least one of adjusting a tap changer setting of the transformer and deactivating the transformer in response to the determination that the difference between the expected power balance and the expected power total loss exceed the predetermined threshold.

2. The method of claim 1, further comprising performing a responsive action in response to identifying that the transformer is subject to a cyber attack when the difference between the first measured value and the first expected value exceeds the first threshold.

3. The method of claim 2, wherein performing the responsive action comprises generating a notification to a user interface that there is an error between the first measured value and the first expected value and that the residual value is not within the predefined upper bound and the predefined lower bound.

4. The method of claim 2, wherein performing the responsive action comprises executing a corrective action to mitigate effects that the difference between the first measured value and the first expected value has on performance of the transformer.

5. The method of claim 1, wherein the second measured value comprises at least one of a current, a voltage, or a temperature.

6. The method of claim 1, wherein comparing the first measured value to the first expected value comprises comparing the first measured value to the first expected value over a time interval.

7. The method of claim 1, wherein determining whether the plurality of measured values have stabilized to the predefined load condition further comprises:
   calculating a rate of change of the plurality of measured values; and
   determining, based on the calculation, whether the rate of change of the operational parameter is below a predefined threshold.

8. The method of claim 1, wherein the plurality of measured values comprise at least one of an oil temperature from a top of a tank or an oil temperature from a bottom of the tank from the one or more sensors, and the second measured value comprises a load current from the one or more sensors.

9. The method of claim 1, wherein the plurality of measured values comprise an ambient temperature from the one or more sensors.

10. The method of claim 1, wherein calculating the first expected value comprises calculating a coolant fluid temperature parameter corresponding to a hotspot temperature based on at least one of a second measured value, a type of the coolant fluid, or physical parameters of the transformer.

11. The method of claim 1, further comprising adjusting the first expected value for harmonic loss contribution in response to a determination that the harmonic distortion is greater than a predetermined threshold.

12. The method of claim 1, wherein calculating the first expected value further comprises calculating real time load losses based on at least one of load losses, eddy current losses, or stray losses, wherein the load losses are a function of temperature dependent winding resistance, and wherein the eddy current losses and stray losses are a function of a harmonic loss coefficient.

13. The method of claim 12, wherein comparing the first measured value to the first expected value comprises comparing a measured proportionality of input and output power and the real time load losses.

14. The method of claim 1, wherein calculating the first expected value comprises calculating an expected power balance from an input bus and an output bus.

15. The method of claim 1, wherein determining whether the plurality of measured values have stabilized to the predefined load condition further comprises:
calculating a variance of the plurality of measured values; and
determining, based on the calculation, whether the variance of the operational parameter is within a predefined range.

16. The method of claim 1, wherein determining whether the plurality of measured values have stabilized to a predefined load condition further comprises determining whether the plurality of measured values vary by 4 degrees C. or less.

17. A controller for securing a transformer, the controller comprising:
circuitry to:
determine a plurality of measured values of a first operational parameter of the transformer based upon one or more signals received from one or more sensors of the transformer, the first operational parameter comprising a temperature associated with the transformer, the plurality of measured values comprising at least one of an oil temperature from a top of a tank or an oil temperature from a bottom of the tank from the one or more sensors;
determine whether the plurality of measured values are within a predetermined range of values to determine whether the plurality of measured values have stabilized to a predefined load condition;
determine a second measured value of a second operational parameter of the transformer based upon one or more signals received from the one or more sensors of the transformer;
calculate a first expected value of the first operational parameter in response to a determination that that the plurality of measured values have stabilized to the predefined load condition, wherein the calculating is based on:
the second measured value of the second operational parameter; and
a model of the transformer that relates the first and second operational parameters;
compare a first measured value of the plurality of measured values of the first operational parameter to the first expected value of the first operational parameter;
determine a residual value indicative of an effect of noise on a measurement of at least one of the first and second operational parameters of the transformer;
determine whether the residual value is within a predefined upper bound and a predefined lower bound;
identify that the transformer is subject to a cyber attack when:
a difference between the first measured value and the first expected value exceeds a first threshold,
the residual value is not within the predefined upper bound and the predefined lower bound;
calculate an expected oil characteristic temperature from at least one of an ambient temperature, an oil temperature from a top of a tank, or an oil temperature from a bottom of the tank;
calculate an expected hot spot characteristic temperature from the at least one of the ambient temperature, the oil temperature from the top of the tank, or the oil temperature from the bottom of the tank;
calculate expected power total loss conditions at the expected hot spot characteristic temperature;
compare an expected power balance and an expected power total loss;
determine whether the difference between the expected power balance and the expected power total loss exceeds a predetermined threshold; and
execute a corrective action in response to a determination that the difference between the expected power balance and the expected power total loss exceed the predetermined threshold to mitigate an effect of the difference between the expected power balance and the expected power total loss, the corrective action comprising at least one of adjusting a tap changer setting of the transformer and deactivating the transformer in response to the determination that the difference between the expected power balance and the expected power total loss exceed the predetermined threshold.

18. A non-transitory machine-readable storage medium comprising a plurality of instructions stored thereon that, in response to being executed, cause a controller to:
determine a plurality of measured values of a first operational parameter of a transformer based upon one or more signals received from one or more sensors of the transformer, the first operational parameter comprising a temperature associated with the transformer;
compare the plurality of measured values to a predetermined threshold value range;
determine, based on the comparison, whether the plurality of measured values have stabilized to a predefined load condition;
determine a second measured value of a second operational parameter of the transformer based upon one or more signals received from the one or more sensors of the transformer;

calculate a first expected value of the first operational parameter in response to a determination that that a first measured value of the plurality of measured values has stabilized to the predefined load condition, wherein the calculating is based on the second measured value of the second operational parameter and a model of the transformer that relates the first and second operational parameters;

compare the first measured value of the first operational parameter to the first expected value of the first operational parameter;

determine a residual value indicative of an effect of noise on a measurement of at least one of the first and second operational parameters of the transformer;

determine whether the residual value is within a predefined upper bound and a predefined lower bound; and identify that the transformer is subject to a cyber attack when:
   a difference between the first measured value and the first expected value exceeds a first threshold, and
   the residual value is not within the predefined upper bound and the predefined lower bound;

calculate an expected oil characteristic temperature from at least one of an ambient temperature, an oil temperature from a top of a tank, or an oil temperature from a bottom of the tank;

calculate an expected hot spot characteristic temperature from the at least one of the ambient temperature, the oil temperature from the top of the tank, or the oil temperature from the bottom of the tank;

calculate expected power total loss conditions at the expected hot spot characteristic temperature;

compare an expected power balance and an expected power total loss;

determine whether the difference between the expected power balance and the expected power total loss exceeds a predetermined threshold; and execute a corrective action in response to a determination that the difference between the expected power balance and the expected power total loss exceed the predetermined threshold to mitigate an effect of the difference between the expected power balance and the expected power total loss, the corrective action comprising at least one of adjusting a tap changer setting of the transformer and deactivating the transformer in response to the determination that the difference between the expected power balance and the expected power total loss exceed the predetermined threshold.

19. The controller of claim 17, wherein the plurality of measured values further comprise an ambient temperature from the one or more sensors.

* * * * *